US007713117B2

(12) United States Patent
Graepel et al.

(10) Patent No.: US 7,713,117 B2
(45) Date of Patent: May 11, 2010

(54) SCORING SYSTEM FOR GAMES

(75) Inventors: Thore K. H. Graepel, Cambridge (GB);
Ralf Herbrich, Cambridge (GB); David Stern, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 634 days.

(21) Appl. No.: 11/532,452

(22) Filed: Sep. 15, 2006

(65) Prior Publication Data
US 2008/0027570 A1    Jan. 31, 2008

Related U.S. Application Data

(63) Continuation-in-part of application No. 11/421,913, filed on Jun. 2, 2006.

(51) Int. Cl.
*A63F 9/24*    (2006.01)
(52) U.S. Cl. .............................. 463/9; 463/12; 463/14; 463/31
(58) Field of Classification Search ................. 273/249, 273/272, 239, 271, 402, 248, 244, 290, 431, 273/299, 376, 450, 456, 243, 108, 108.1, 273/108.55, 236–242, 287–292, 294, 148 R, 273/309; 463/930, 31, 40, 41; 700/91; 434/128
See application file for complete search history.

(56) References Cited

U.S. PATENT DOCUMENTS

| | | | | | |
|---|---|---|---|---|---|
| 3,977,682 | A | * | 8/1976 | Aida | 273/237 |
| 4,372,558 | A | * | 2/1983 | Shimamoto et al. | 463/41 |
| 4,492,581 | A | * | 1/1985 | Arai et al. | 434/128 |
| 5,678,001 | A | * | 10/1997 | Nagel et al. | 345/473 |
| 5,688,126 | A | * | 11/1997 | Merritt | 434/128 |
| 6,581,934 | B2 | * | 6/2003 | Powell | 273/267 |
| 7,047,169 | B2 | * | 5/2006 | Pelikan et al. | 703/2 |
| 7,050,868 | B1 | | 5/2006 | Graepel et al. | |
| 7,059,964 | B1 | * | 6/2006 | Harpaz | 463/9 |

OTHER PUBLICATIONS

"Knowledge-Based Search in Competitive Domains" by S. Walczak, May/Jun. 2003, IEEE, vol. 15, No. 3, pp. 735-742.*

(Continued)

*Primary Examiner*—James S McClellan
(74) *Attorney, Agent, or Firm*—Lee & Hayes, PLLC

(57) ABSTRACT

Scoring a board configuration for a territory board game is often not straightforward and yet there is a desire to determine such scores quickly and accurately. For example, in the game of GO, determining the score at the end of the game involves assessing whether stones on the board are alive or dead which is a difficult judgment. Given a board configuration, the game is played by a scoring system to obtain a terminal board configuration. This is repeated to obtain a plurality of terminal board configurations from which an assessment can be made as to how likely each board position is to be won by a particular player at the end of the game. The scoring system obtains the terminal board configurations by playing random moves or by making a biased sampling of moves. The biased sampling is made using an evaluation function or in any suitable way. In the game of GO, seki positions are quickly and easily identified. An automated game playing system uses the output of the scoring system to assess when to offer to end a game. The output of the scoring system can also be used to provide hints to players during a game.

17 Claims, 19 Drawing Sheets

OTHER PUBLICATIONS

"Learning on Graphs in the Game of Go" by T. Graepel et al., ICANN, LNCS 2130, Springer-Verlag Berlin Heidelberg 2001, pp. 347-352.*

"Applets", retrieved on Jul. 2, 2007 at http://java.sun.com/applets>>, 2007, 1 page.

Estrin, et al.. "Embedding the Internet". Communications of the ACM, vol. 45 No. 5, May 2000, pp. 39-41.

Frank, et al. "Query scoping for the sensor internet". In Proc. of IEEE ICPS 2006, Lyon, France, Jun. 2006, 4 pages.

Haroon et al., "Ad Hoc Interaction with Sensor Devices Using Senslets", Euro SSC, Oct. 2007, 3 pages.

Hsieh, "Using sensor networks for highway and traffic applications". IEEE Potentials, vol. 23 No. 2, 2004, pp. 13-16.

Jini, Architecture Specification, retrieved on Jul. 2, 2007 at << http//www.sun.com/jini/specs/>>, 2 pages.

Kindberg et al. "People, Places, Things: Web Presence for the Real World." WMCSA 2000, Monterey, USA, Dec. 2000, pp. 1-15.

Koshy et al., " Vmstar: synthesizing scalable runtime environments for sensor networks". In Proc. 3rd Intl. Conference on Embedded Networked Sensor Systems (SenSys 2005), pp. 1-12.

Levis et al., "Mate: a tiny virtual machine for sensor networks." ACM SIGOPS Operating Systems Review, vol. 36, No. 5, Dec. 2002, pp. 85-95.

Lorincz et al., "Sensor networks for emergency response: challenges and opportunities" IEEE Pervasive Computing, vol. 3, No. 4, 2004, pp. 16-23.

A. Mainwaring, et al "Wireless sensor networks for habitat monitoring". In Proc. of WSNA 2002, Atlanta, USA, Sep. 2002, pp. 1-10.

Oppermann et al., "UWB wireless sensor networks: UWEN a practical example". IEEE Communications Magazine, vol. 42, Dec. 2004, pp. 27-32.

A. Santanche, et al "Senseweb: Browsing the physical world in real time", In Proc. of ACM/IEEE IPSN 2006, Nashville, TN, USA, Apr. 2006, pp. 1-2.

"SenseWeb" website, retrived on Jul. 2, 2007 <<http://research.microsoft.com/nec/senseweb>>, 2007, pp. 1-5.

Siegemund. "Cooperating Smart Everyday Object—Exploiting Heterogeneity and Pervasiveness in Smart Environments", DISS. ETH No. 15833, 2004, pp. 126-139.

Siegemund, et al., "Rendezvous layer protocols for Bluetooth-enabled smart devices" Personal Ubiquitous Computing, Jul. 2003, pp. 91-101.

Siegemund, et al."Senslets—Applets for the Sensor Internet", IEEE WCNC Apr. 2008, 1 page.

"Smart Personal Object Technology", retrieved on Jul. 2, 2007 at <<http://www.microsoft.com/spot>>, 2007, p. 1.

Bloom, B.H., "Space/time trade-offs in hash coding with allowable errors", Communications of the ACM, 13 (7):422-426, 1970.

Bouzy, Bruno, "Associating domain-dependent knowledge and Monte Carlo approaches within a Go program", In Joint Conference on Information Sciences, 2003, pp. 1-4.

Bouzy, Bruno, "Associating shallow and selective global tree search with Monte Carlo for 9x9 Go", In 4rd Computer and Games Conference, Ramat-Gan, 2004, pp. 1-15.

Bouzy, et al. "Bayesian generation and integration of K-nearest-neighbour patters for 19x19 go", In G. Kendall and S. Lucas, editors, Proceedings of the IEEE 2005 Symposium on Computational Intelligence and Games, pp. 176-181, 2005.

Bouzy et al., "Computer go: An AI oriented survey", Artificial Intelligence, 132(1):39-103, 2001.

Bouzy et al., "Monte Carlo Go Developments", In Ernst A. Heinz H. Jaap van den Herik, Hiroyuki Iida, editor, Advances in Computer Games conference (ACG-10), Graz 2003, pp. 159-174. Kluwer, 2003.

Brugmann, Bernd, "Monte Carlo Go", Oct. 9, 1993, pp. 1-13.

Bouzy, Bruno, "Associating domain-dependent knowledge and Monte Carlo approaches within a Go program" Information Sciences, 2005, pp. 1-11.

Cazenave, T., "Automatic acquisition of tactical Go rules", In Proceedings of the Game Programming Workshop in Japan '96, 1996.

Cazenave, T., "Generation of patterns with external conditions for the game of Go", In H. J. van den Herik and B. Monien, editors, Advances of Computer Games 9.

Cohen, S. et al., "Spectral Bloom Filters", SIGMOD 2003, Jun. 9-12, 2003, San Diego, CA.

de Groot, F., "Moyogo studio", 2004/2005.

Kaminski, Piotr, "Las Vegas Go", available by Internet., 2002, pp. 1-14.

Lees, Jennifer, "Computer-Based GO", Dissertation for Part II of the Computer Science Tripos, May 12, 2003, pp. 1-74.

Stern, D. et al. "Modelling uncertainty in the game of Go" In Advances in Neural Information Processing Systems 16, pp. 33-40, 2004.

"The Game of Go: An Ideal Environment for Capstone and Undergraduate Research Projects", retrieved on Sep. 14, 2006 at <<http://portal.acm.org/citation.cfm?id=611939&dl=ACM&coll=portal>>, 3 pages.

van der Werf, Erik C.D. et al., "Learning to Predict Life and Death from Go Game Records", 4 pages.

van der Werf, Erik C.D. et al., "Solving Go on Small Boards", ICGA Journal, Jun. 2003, pp. 92-107.

van der Werf, E. et al., "Local move prediction in Go", In 3rd International Conference on Computers and Games, Edmonton, 2002.

Zobrist, A., "A new hashing method with applications for game playing", ICCA Journal, 13(2):69-73, 1990.

* cited by examiner

| + | + | + | + | + | + | + | + | + | + | + | + | + | + | + | + | + | + | + |
|---|---|---|---|---|---|---|---|---|---|---|---|---|---|---|---|---|---|---|
| + | 14 | 14 | 14 | 14 | 14 | 14 | 14 | 14 | 14 | 14 | 14 | 14 | 14 | 14 | 14 | 14 | 14 | + |
| + | 14 | 14 | 14 | 14 | 14 | 14 | 14 | 13 | 13 | 13 | 14 | 14 | 14 | 14 | 14 | 14 | 14 | + |
| + | 14 | 14 | 14 | 14 | 14 | 14 | 13 | 13 | 12 | 13 | 13 | 14 | 14 | 14 | 14 | 14 | 14 | + |
| + | 14 | 14 | 14 | 14 | 14 | 13 | 12 | 12 | 11 | 12 | 12 | 13 | 14 | 14 | 14 | 14 | 14 | + |
| + | 14 | 14 | 14 | 14 | 13 | 12 | 11 | 11 | 9 | 11 | 11 | 12 | 13 | 14 | 14 | 14 | 14 | + |
| + | 14 | 14 | 14 | 13 | 12 | 11 | 10 | 8 | 6 | 8 | 10 | 11 | 12 | 13 | 14 | 14 | 14 | + |
| + | 14 | 14 | 13 | 12 | 11 | 10 | 7 | 5 | 4 | 5 | 7 | 10 | 11 | 12 | 13 | 14 | 14 | + |
| + | 14 | 13 | 13 | 12 | 11 | 8 | 5 | 3 | 2 | 3 | 5 | 8 | 11 | 12 | 13 | 13 | 14 | + |
| + | 14 | 13 | 12 | 11 | 9 | 6 | 4 | 2 | 1 | 2 | 4 | 6 | 9 | 11 | 12 | 13 | 14 | + |
| + | 14 | 13 | 13 | 12 | 11 | 8 | 5 | 3 | 2 | 3 | 5 | 8 | 11 | 12 | 13 | 13 | 14 | + |
| + | 14 | 14 | 13 | 12 | 11 | 10 | 7 | 5 | 4 | 5 | 7 | 10 | 11 | 12 | 13 | 14 | 14 | + |
| + | 14 | 14 | 14 | 13 | 12 | 11 | 10 | 8 | 6 | 8 | 10 | 11 | 12 | 13 | 14 | 14 | 14 | + |
| + | 14 | 14 | 14 | 14 | 13 | 12 | 11 | 11 | 9 | 11 | 11 | 12 | 13 | 14 | 14 | 14 | 14 | + |
| + | 14 | 14 | 14 | 14 | 14 | 13 | 12 | 12 | 11 | 12 | 12 | 13 | 14 | 14 | 14 | 14 | 14 | + |
| + | 14 | 14 | 14 | 14 | 14 | 14 | 13 | 13 | 12 | 13 | 13 | 14 | 14 | 14 | 14 | 14 | 14 | + |
| + | 14 | 14 | 14 | 14 | 14 | 14 | 14 | 13 | 13 | 13 | 14 | 14 | 14 | 14 | 14 | 14 | 14 | + |
| + | 14 | 14 | 14 | 14 | 14 | 14 | 14 | 14 | 14 | 14 | 14 | 14 | 14 | 14 | 14 | 14 | 14 | + |
| + | + | + | + | + | + | + | + | + | + | + | + | + | + | + | + | + | + | + |

FIG. 7

SCORING SYSTEM FOR GAMES

CROSS REFERENCE TO RELATED APPLICATION

This application is a continuation-in-part of U.S. patent application Ser. No. 11/421,913, filed on Jun. 2, 2006 entitled, "Learning belief distributions for game moves" which is incorporated herein by reference.

TECHNICAL FIELD

This description relates generally to scoring systems for games. It is particularly related to, but in no way limited to, scoring systems for board games such as GO and other territory games.

BACKGROUND

There is a desire to provide automated scoring systems for board games such as, GO, territory games and the like. The players may be all human players; all computer system players; or some human players and some computer system players.

Often the process of scoring a board configuration for this type of game is not straightforward and yet there is a desire to determine such scores quickly and accurately. For example, in the game of GO, determining the score at the end of the game involves assessing whether stones on the board are alive or dead. Accurately determining life or death is difficult; even very strong human players sometimes disagree over the life or death status of a group of stones.

In addition, scoring at the end of a game of GO is complicated by the fact that different scoring methods apply according to the rules being followed. The two main scoring methods are territory scoring and area scoring. Territory scoring, used by the Japanese rules, counts the surrounded territory plus the number of captured opponent stones. Area scoring, used by the Chinese rules, counts the surrounded territory plus the alive stones on the board. The result of the two methods is typically the same except in some particular circumstances involving so called seki positions or because one player placed more stones than the other. However, it is difficult to identify seki positions accurately using computer GO systems without great computational expense and/or complexity.

Previous attempts have been made to program computers to play Go. However, performance has not matched the level of chess programs even the weaker of which easily match the ability of an average club player. In contrast, the best Go programs play only at the level of weak amateur Go players and Go is therefore considered to be a serious AI (artificial intelligence) challenge not unlike Chess in the 1960s. There are two main reasons for this state of affairs: firstly, the high branching factor of Go (typically 200 to 300 potential moves per position) prevents the expansion of a game tree to any useful depth. Secondly, it is difficult to produce an evaluation function for Go positions. A Go stone has no intrinsic value; its value is determined by its relationships with other stones. Go players evaluate positions using visual pattern recognition and qualitative intuitions which are difficult to formalize.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Scoring a board configuration for a territory board game is often not straightforward and yet there is a desire to determine such scores quickly and accurately. For example, in the game of GO, determining the score at the end of the game involves assessing whether stones on the board are alive or dead which is a difficult judgment. Given a board configuration, the game is played by a scoring system to obtain a terminal board configuration. This is repeated to obtain a plurality of terminal board configurations from which an assessment can be made as to how likely each board position is to be won by a particular player at the end of the game. The scoring system obtains the terminal board configurations by playing random moves or by making a biased sampling of moves. The biased sampling is made using an evaluation function or in any suitable way.

In the game of GO, seki positions are quickly and easily identified using the proposed scoring method. An automated game playing system uses the output of the scoring system to assess when to offer to end a game. The output of the scoring system can also be used to provide hints to players during a game.

The methods described herein may be performed by software in machine readable form on a storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

FIG. 7 shows as example of a set of 14 pattern templates;

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

The term "board position" is used to refer to a square, grid intersection or other playing location used in a board game. For example, in GO, board positions are grid intersections.

The term "board configuration" is used to refer to information specifying the state of play at a particular stage of a board game. For example, in GO, this comprises details of locations and colors of all stones on the board.

The embodiments now described relate to the game of GO. However, it is noted that many of these embodiments may also be applicable to other territory board games where it is required to automatically determine a score for a given board configuration. Some information about the game of GO is now given to aid understanding of the embodiments described with reference to GO.

The game of Go originated in China over 4000 years ago. Its rules are straightforward. Two players, Black and White, take turns to place stones on the intersections of an N×N grid (usually N=19 but smaller boards are in use as well). All the stones of each player are identical. Players place their stones in order to create territory by occupying or surrounding areas of the board. The player with the most territory at the end of the game is the winner. A stone is captured if it has been completely surrounded (in the horizontal and vertical directions) by stones or the opponent's color.

Figure 1:
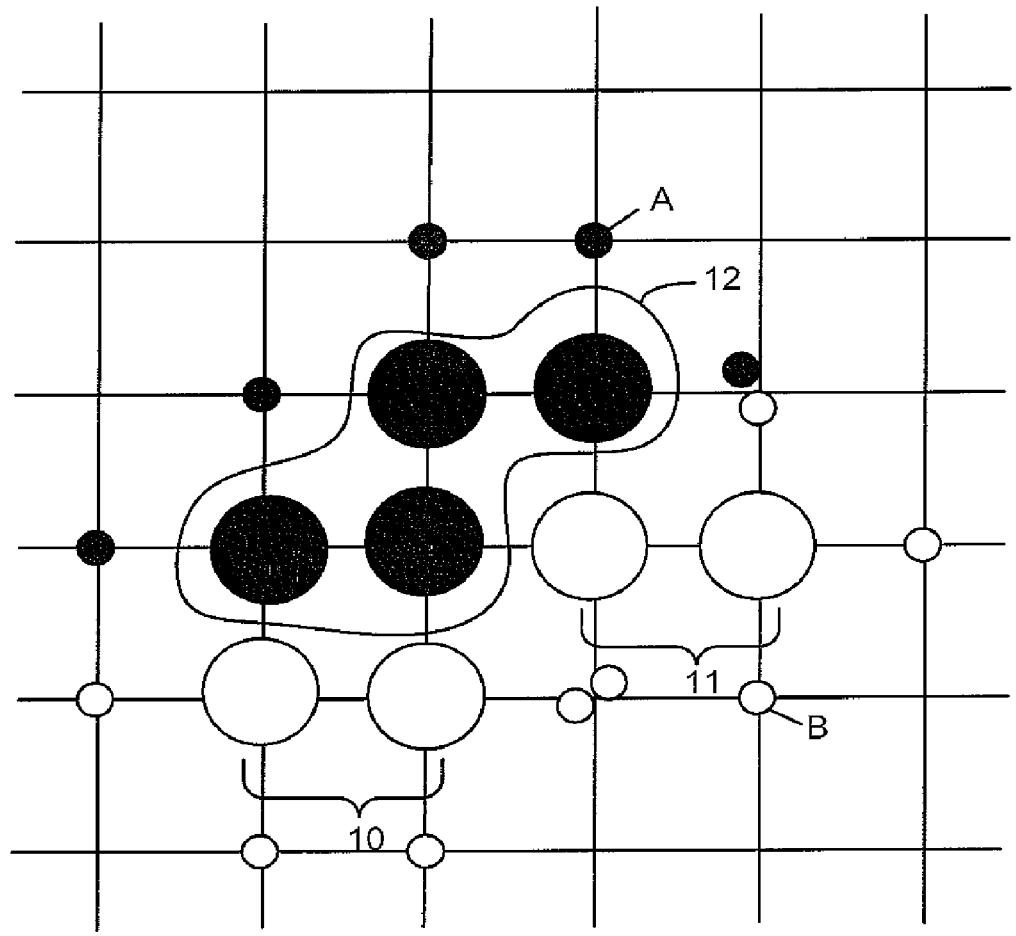
FIG. 1 shows part of a GO board with two chains of white stones and one chain of black stones.
Figure 2A:
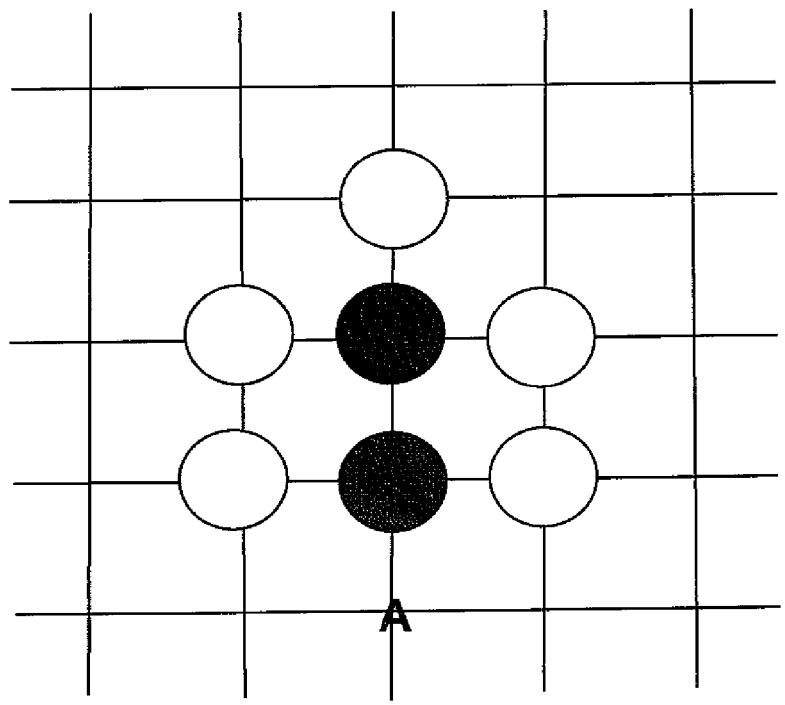
FIG. 2a shows part of a GO board with a chain of black stones.
Figure 2B:
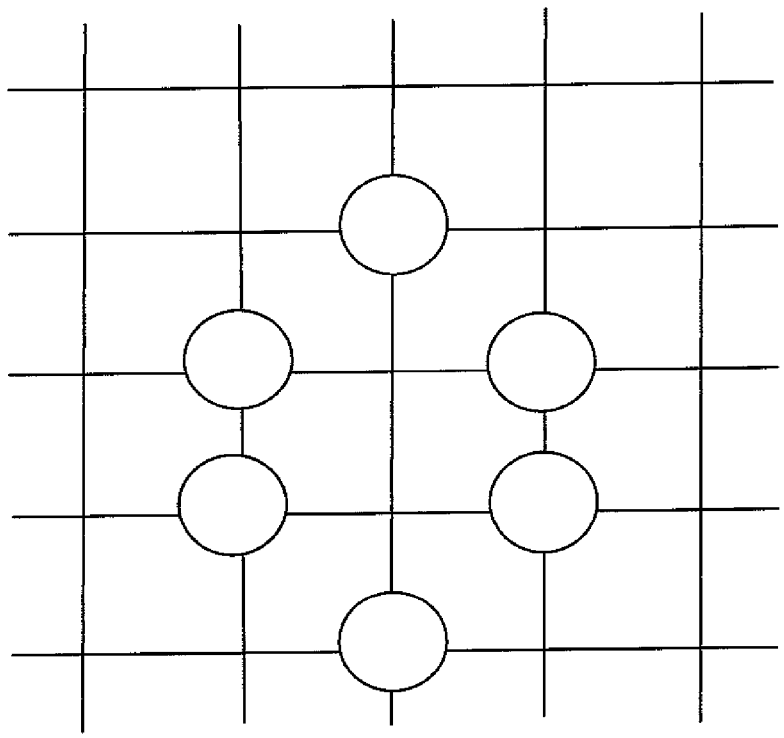
FIG. 2b shows the part of the GO board of FIG. 2a after capture of the black stones.

For example, FIG. 1 shows part of a Go board. The players take turns to place a stone on a grid intersection or point. Empty adjacent points to a store are referred to as liberties. Thus in FIG. 1 small black dots A are used to show the liberties of the black stones. Small white circles B are used to show the liberties of the white stones. FIG. 1 shows two chains of white stones 10, 11 and one chain of black stones 12. Stones in a chain share their liberties. When a stone or a chain of stones is surrounded by opponent stones it has no liberties and is therefore captured and removed from the board. For example FIG. 2a shows a region of a Go board. If white plays at A in that situation, then the black chain loses its last liberty. The black chain is then captured and removed from the board as illustrated in FIG. 2b. A player may pass instead of placing a stone. The game ends when both players pass consecutively. The game is then scored with the highest scoring player being the winner. For example, according to Japanese rules a player's score is the number of empty points enclosed by his or her stones plus the number of points occupied by his or her stones. Full details of the rules of Go are not given here because they are widely publicly available, for example, in "The Game of Go", Matthew Macfadyen, 1998 Carlton Books Limited, ISEN 1858684919. Despite the fact that the rules are simple the resulting game play is very complex and interesting. For example, to cover the largest area one needs to spread out but to secure an area of the board it is good to play stones close together. Also, to try to cover a large area, expansionist play is needed but this potentially leaves weaknesses that can be exploited by the opponent. If a player places stones far from the edge of the board the opponent has space to invade but placing stones close to the edge gives reduced territory and influence.

As mentioned above, calculating the score is not straightforward because it involves assessing whether stones on the board are alive or dead. In addition, so called seki positions should be identified if possible. The concepts of "alive" and "dead" and seki positions in the game of GO are explained in detail in many publicly available materials such as "The Game of GO" referred to above. A brief explanation of these concepts is now given.

Dead stones can be thought of as those which are controlled by the opponent; they can be captured by the opponent but have not yet been captured. Chains and clusters of stones can be thought of as dead. As mentioned above, a chain of stones is solidly connected along a line of the board and shares its liberties. A cluster of stones is also solidly connected along the lines of the board and can only be captured as a unit. A group of stones is a loose cluster where the stones have not yet finished connecting up but are likely to be able to do so later in the game.

We use the term "eye" to refer to empty board positions inside the boundary of a chain of stones. It is possible for groups of stones to be formed which have two separate eyes or the ability to create two separate eyes. This type of group is said to be "alive". In contrast, stones which are unable to form two eyes or connect up to other living stones are "dead".

A seki position exists when two groups of stones of different color coexist and any move made disadvantages the side making it. In this situation neither player has an incentive to move.

Figure 3:
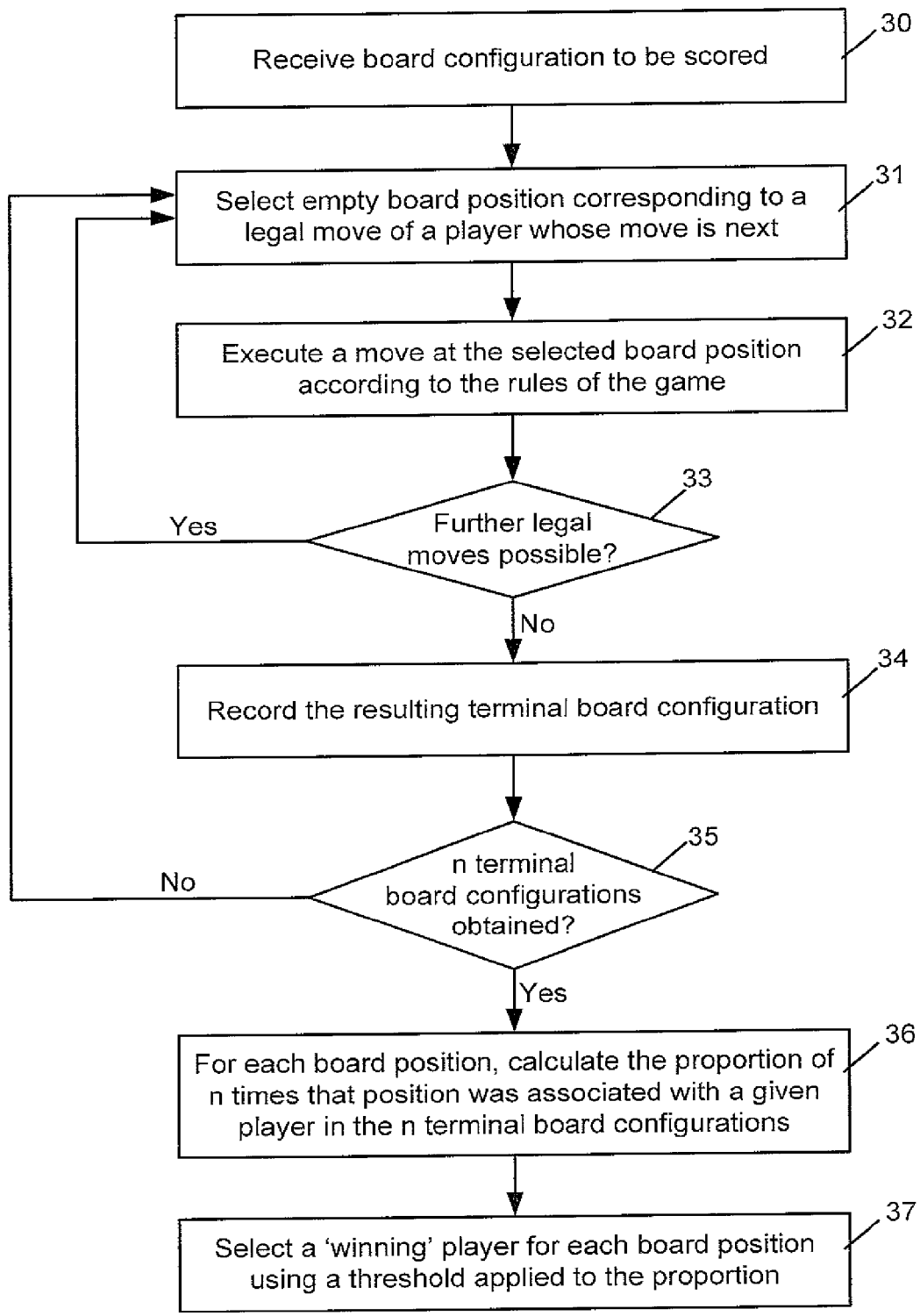
FIG. 3 is a flow diagram of an example of a method of automatically scoring a given board configuration in a territory board game.

An example of our method for automatically scoring a given board configuration in the game of GO or another suitable territory board game is now given with reference to FIG. 3. An advantage of this method is that it can be applied at any stage of the game rather than only at terminal board configurations. It is quick and simple to perform such that feedback can be provided to a human player or a computer player rapidly. In addition, the results are accurate and comparable with scores agreed by human players.

A board configuration to be scored is received (box 30) and an empty board position corresponding to a legal move of a player whose move is next is then selected (box 31). Details of how this selection is made are given below. A move is then executed according to the rules of the game at the selected board position. For example, as a result of the move, playing pieces may be captured. This process is repeated until no further legal moves are possible (box 33) and the resulting terminal board configuration is recorded (box 34). The process is repeated (boxes 31 to 34) until a plurality, n, of terminal board configurations are obtained (box 35). Any suitable value of n can be used and this will vary depending on the selection criteria used when selecting the empty board position for the next move (box 31).

For each board position, the method then calculates the proportion of n times that position was associated with a given player in the n terminal board configurations (box 36). A "winning" player for each board position can then be determined using a threshold applied to the proportion. Any suitable threshold can be used.

If the board configuration being scored is from the end of a game the winning player can then be determined by combining the results for each board position. Any suitable method of combining the results can be used. If the board configuration being scored is not from the end of a game an estimate of the likely outcome of the game is obtained in the form of a numerical score. The results can also be thought of as a probability for each board position as to whether it will be black or white at the end of the game.

As mentioned above a "winning" player for each board position can be determined using a threshold applied to the calculated proportion. Any suitable threshold can be used. For example, say the threshold is 80%, if the proportion of n times the board position is occupied by black in the terminal board configurations is greater than or equal to 80%, then the board position is won by black.

It is also possible to identify situations where the player controlling the board position is not clear cut; for example, suppose that the proportion of n times the board position is occupied is 53%. In this situation the scoring system may be arranged to prompt the players, via a graphical user interface or other means, for a decision as to which player should control the board position. For example, if the proportion for a particular board position is within a specified range, the system is arranged to prompt one or more of the players for information as to which player the particular board position is to be associated with.

In some embodiments the scoring system comprises a graphical user interface arranged to present to one or more players of the game, information about the calculated proportions. For example, a graphical representation of the board and playing pieces is presented. Superimposed on this graphical representation marks may be given where the size of the marks represent the calculated proportions and the color of the marks the selected players. For example, if the board configuration being scored is not from the end of a game an estimate of the probability for each board position as to whether it will be black or white at the end of the game is found. This information is advantageously presented using colored squares or other marks at the board positions with the size of the marks indicating the estimated probability. If the next move is black's then such black marks can be used to indicate possible future moves of black and an indication as to how far that board position is already under the control of black. In this way the marks provide a hint to the player. For example, a move to a board position that is already highly likely to be controlled by black at the end of the game is arguably less advantageous than an alternative move with a lower probability of being black at the end of the game.

Figure 4A:
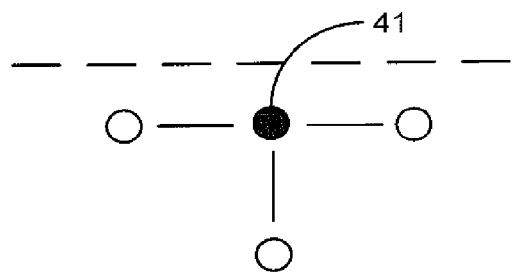
FIGS. 4a, 4b and 4c each show an example of an eye in the game of GO.
Figure 4B:
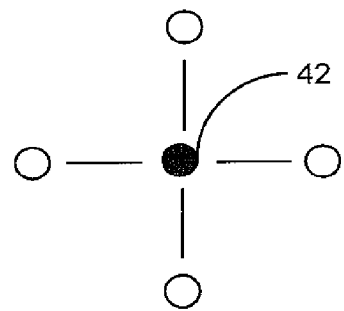
Figure 4C:
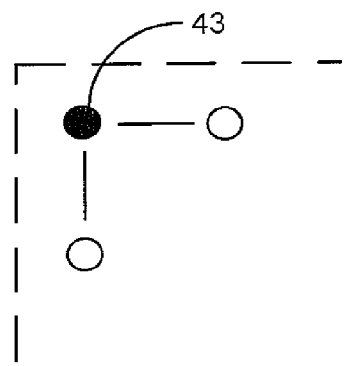

In the game of GO, in order to ensure that a terminal board configuration is eventually reached, it is necessary to avoid filling in one's own eyes. Otherwise a cycle or loop can be entered during the selection step (box 31) which prevents reaching a terminal board configuration. Therefore, the selection step may also comprise only selecting empty board positions which do not fill in eyes of the current player. For example, the step of selecting an empty board position further comprises selecting that board position such that it is not within an eye of the player whose move is current. We identify a potential eye as an empty board position whose four nearest neighbour board positions are occupied by the player whose move is current or are off-board positions. This is illustrated in FIGS. 4a, 4b and 4c. FIG. 4a shows an eye 41 surrounded by three stones with the edge of the board being indicated by a dotted line. FIG. 4b shows an eye 42 surrounded by four stones. FIG. 4c shows an eye 43 surrounded by two stones with the edges of the board being indicated by dotted lines.

The process of selecting an empty board position (box 31) is made in a substantially random manner in some embodiments. This is advantageous in that the selection process is straightforward and computationally inexpensive.

In other embodiments the step of selecting an empty board position is made using a biased sampling technique. This involves more computation than making a random selection but typically enables fewer terminal board configurations to be determined (i.e. smaller value of n) whilst still achieving good results. This is because instead of sampling uniformly from the available moves the samples are biased such that some moves are more likely to be played than others. For example, an evaluation function for the game may be taken into account such that better moves are played more often than worse moves. As a consequence, the resulting sample may be more indicative of what would happen in a real game. While the purely random sampling typically requires anywhere between about 50 and 500 samples, the number may be reduced to 10 to 100 samples when using biased sampling.

Any suitable biased sampling technique can be used. For example, favouring moves at the middle of the board rather than the border.

In a particular example we use learnt information about belief distributions associated with patterns corresponding to moves in a game. For example, the step of selecting an empty board position is made on the basis of learnt information about patterns corresponding to game moves. Details about these patterns and how the belief distribution information is learnt are given later in this document. In this example, the step 31 of FIG. 3 of selecting a move comprises carrying out a pattern matching process over the board configuration to identify patterns corresponding to potential moves. Learnt belief distributions are then accessed and used to make the biased sampling.

As mentioned above, a particular problem when scoring the game of GO involves identifying seki positions. We provide an accurate, simple and fast method for achieving this. We recognise that seki positions are typically characterised by two chains of opposite colour whose life/death evaluations are anti-correlated and yield a proportion of about 50% under the method of FIG. 3. The scoring system is thus arranged to identify any configuration of playing pieces associated with a board position having these characteristics. If a pair of chains of opposite colour are identified in the board configuration samples a check is made in the terminal board configuration samples if their life/death status is anti-correlated across samples, i.e., for most samples if one of the groups is alive the other one is dead, or vice versa. Once a seki position has been identified this can be drawn to the attention of a player via the graphical user interface and/or the score adjusted according to the particular rules being played.

In another example, the scoring system is used in conjunction with an automated system for playing the game. For example, in order to assist with determining when to offer to end the game. In the past it has been very difficult for computer GO systems to offer to end the game at sensible times. We address this by using the calculated proportions for each available board position obtained as described above.

As mentioned above, our scoring system can provide an estimate of the probability for each board position as to whether it will be black or white at the end of the game. This information can be used to assess the volatility of groups, chains or clusters of playing pieces. That is, if a chain, group or cluster has a high probability of being controlled by one player then it has a low volatility. Otherwise its volatility is high and there is a reason to continue the game; i.e. to try to take control of the territory involved. If volatility is low over the board configuration then there is reason to offer to end the game. Thus we provide an automated system for playing a territory board game which is arranged to receive information about the current board configuration; access calculated proportions for board positions (as described above); and to determine whether to offer to end the game on the basis of the calculated proportions.

For example, the automated system might check whether there are any groups, clusters or chains of stones in the current board configuration which have a high volatility. That is, any groups, clusters or chains where there are one or more associated board locations where the calculated proportions are within a specified range. This can be done when a human player offers to end the game and/or after a specified number of moves.

Figure 6:
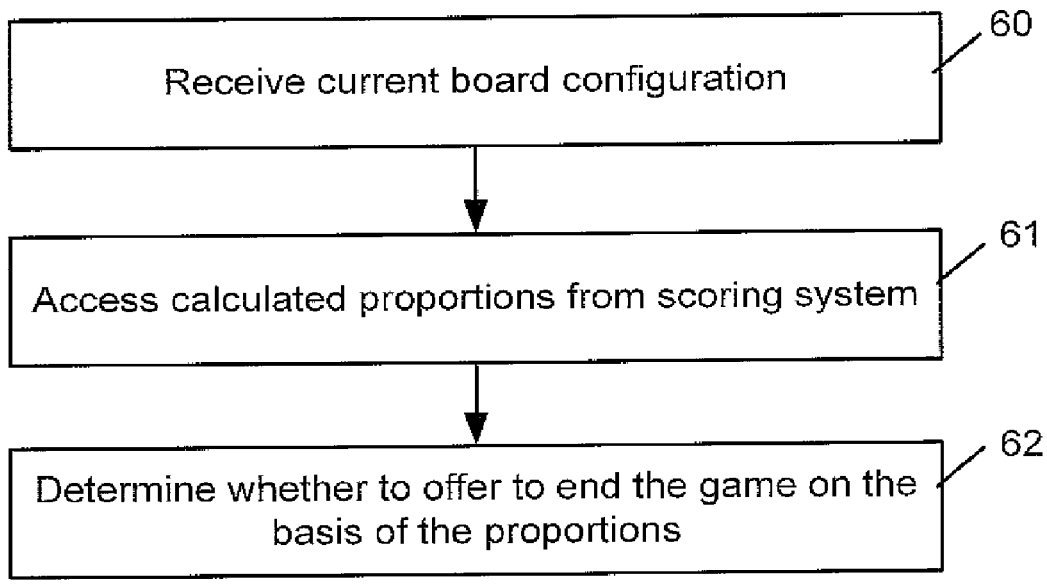
FIG. 6 is a flow diagram of a method of automatically determining whether to offer to end a territory board game.

FIG. 6 is a flow diagram of a method at an automated system for playing a territory board game. The current board configuration is known (box 60) and calculated proportions are accessed from a scoring system (box 61) for each board location. These proportions provide an estimate of how likely each board location is to be associated with a particular player at the end of the game. The game system then determines whether to offer to end the game on the basis of the proportions (box 62).

Figure 5:
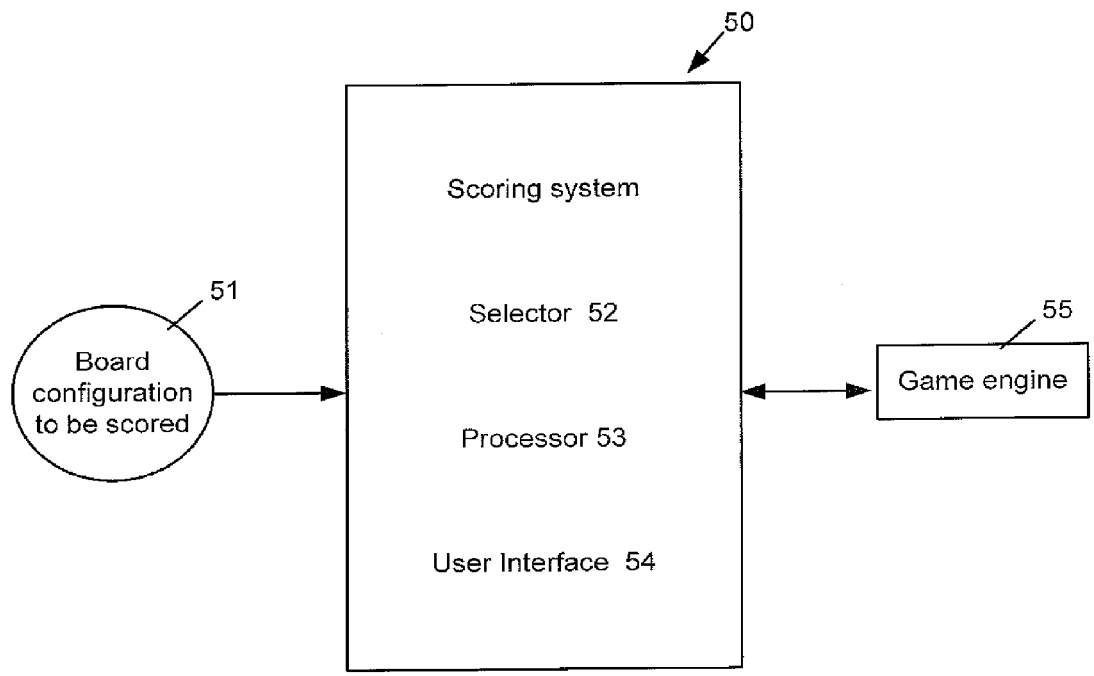
FIG. 5 is a schematic diagram of an apparatus for automatically scoring a territory board game.

FIG. 5 is a schematic diagram of a scoring apparatus 50 comprising:
an input arranged to receive a board configuration 51 to be scored in a game;
a selector 52 arranged to select an empty board position corresponding to a legal move of a player whose move is next;
a game engine 55 arranged to execute a move at the selected board position according to the rules of the game;
a processor 53 arranged to repeat the selecting and executing steps until no further legal moves remain for play and to record the resulting terminal board configuration;
the processor being further arranged to repeat steps (i), (ii) and (iii) of selecting, executing and repeating to obtain a plurality of terminal board configurations, n;
the processor being further arranged to, for each board position, calculate the proportion of n times that board position was associated with a given player in the n terminal board configurations; and to select a player to be associated with that board position on the basis of a threshold applied to the calculated proportion.

The scoring apparatus optionally comprises a user interface 54 as described above. The selector, processor and user interface are provided using any suitable computer and display apparatus. For example, the game engine, user interface, selector and processor are provided using a personal computer or game console having suitable software arranged to carry out the methods described herein.

In some embodiments, the step of selecting an empty board position is made on the basis of learnt information about patterns corresponding to game moves. Details about these patterns and how the belief distribution information is learnt are now given together with details of an apparatus and method for playing a game using the belief distributions.

Patterns, Pattern Templates and Pattern Classes

We define a pattern as an exact arrangement of stones (or other playing pieces) within a sub region of a board (or other defined playing space comprising a grid), centered on an empty location where a move is to be made. The possible sub-regions are preferably specified as pattern templates as described below. By focusing on exact local patterns for move prediction we achieve advantages. We are able to match patterns very efficiently because of their local range and because the matching procedure does not have to take into account wildcards, i.e., parts of the patterns that match to more than one possible value. As a result we can train our system on a very large number of games without requiring impractical processing capacity and time. Also, we can generate moves for play very quickly because we are able to match the patterns very efficiently.

Figure 8:
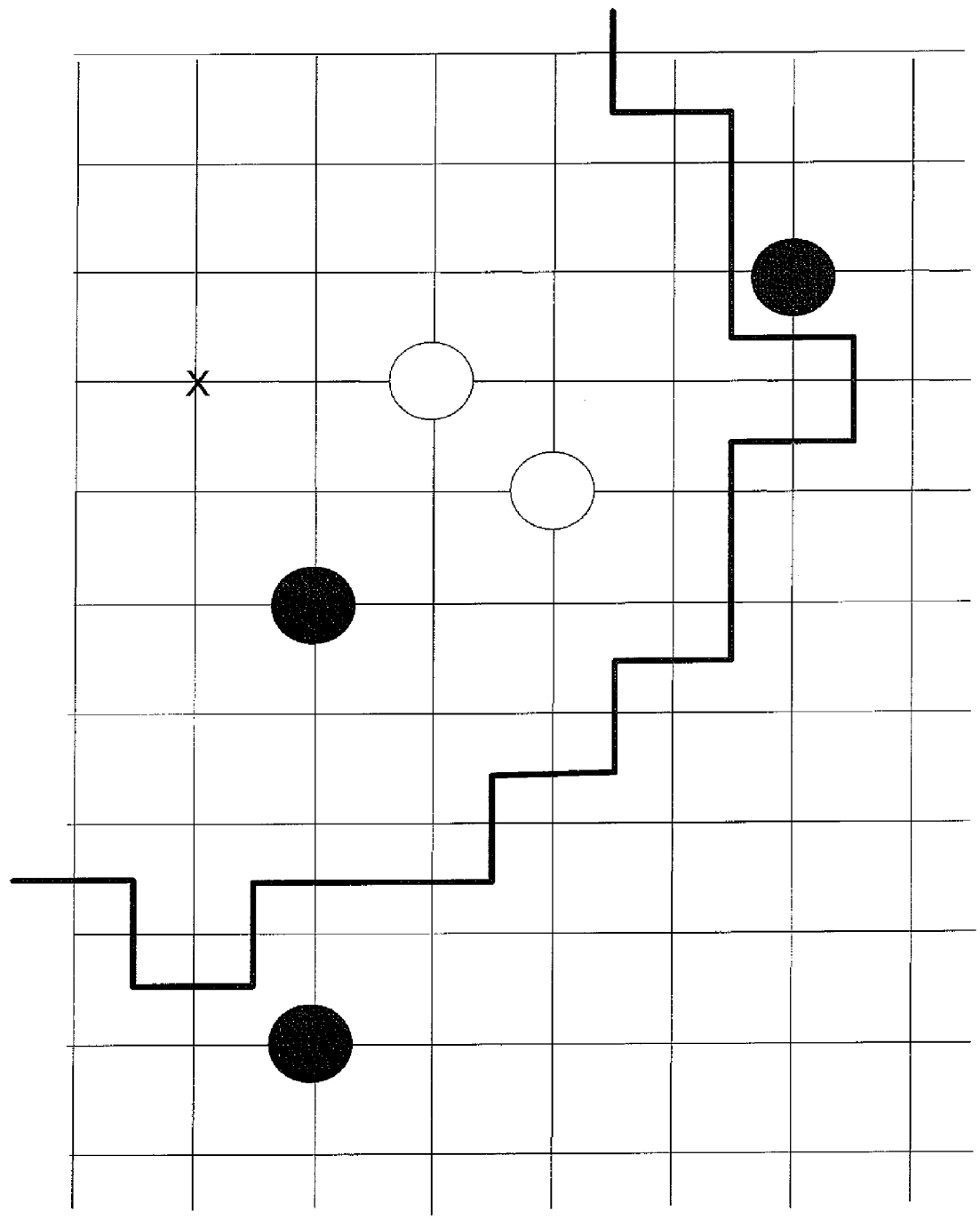
FIG. 8 shows part of a Go board with pattern template TII centered about grid point 2-4.

In a preferred embodiment, the pattern templates are a nested sequence of increasing size so as to be able to use large patterns with greater predictive power when possible, but to be able to match smaller patterns when necessary. FIG. 7 shows an example of a sequence of 14 nested pattern templates. In this example, template 1 comprises the square labeled 1, template 2 comprises the squares labeled either 1 or 2, template 3 comprises the squares labeled 1, or 2 or 3 and so on. Template 14 comprises all the squares including those extending beyond the plot as indicated by "+". FIG. 8 shows part of a board configuration from an expert game. Pattern template T11 is shown centered about the grid point marked with a cross in that FIG.

We automatically generate and learn from the patterns in two distinct processes. Firstly we harvest sufficiently frequent patterns from historical game records and then we learn from those patterns. The historical game records are preferably taken from games involving expert players although this is not essential. In one group of embodiments we learn urgencies for the patterns (or pattern classes as explained later) using a ranking model. In another group of embodiments we learn an estimate of a play probability (probability of being played) for each pattern or pattern class. Both groups of embodiments use types of Bayesian inference. Each board configuration contains a subset of the harvested move-patterns of which the player in the historical record chooses one. In the urgency embodiment, this information indicates that the chosen move-pattern has a higher urgency than that of the other possible patterns. In the play probability embodiments if an available move is observed as played its probability estimate is increased and if it is observed as not being played its probability estimate is decreased. It is this information together with the fact that typical move-patterns occur in more than one position that allows the system to generalize across specific board configurations.

In some embodiments we advantageously group patterns into pattern classes in order to reduce computational complexity, storage requirements, computation time, required processing capacity and the like. However, it is not essential to use pattern classes. Computations can be carried out for each individual member of a pattern class.

We recognize that every pattern can occur in up to 16 different ways in the case of GO and in other multiples for other games depending on allowable board configurations etc. For example, in the case of GO, the 16 different ways can be thought of as the 8 different symmetries of a square (which can be rotated through 0, 90, 180 and 270 degrees for itself and for its mirror image) and each of these 8 different symmetries can occur for either black or white playing pieces (color reversal) giving 16 different options. A pattern class is then an exact arrangement of playing pieces within a sub-region of the board, centered on an empty location where a move is to be made, and all the other equivalent patterns occurring as a result of symmetries and/or color reversal.

Pattern Harvesting

In order to learn from a huge number of known Go board moves (or board moves of other games such as Chess and the like) from historical game records we are faced with a number of problems. The large number of board moves per game (e.g. 250) leads to problems when we need to learn from large numbers of games. These problems are associated with limits on processing capacity, storage capacity and the like. In addition, we require some degree of generalization in order to learn effectively.

That is, in systems which learn by example, if all historical examples are stored without generalization, it is difficult to deal with new instances that have not been observed before. Instead, it is preferred to make generalizations where possible such that new instances can be appropriately dealt with. In the present case we achieve this generalization in the case of games such as GO, Chess and other games involving configuration of playing pieces, by selecting less than the full set of pattern classes from historical game moves for use by a learning system. In the present application we refer to this selection process as pattern harvesting. We recognize that a particular problem with such pattern harvesting lies in deciding which patterns to harvest and which to ignore. One option is to randomly select, or select in some arbitrary manner, a specified proportion of historical patterns from game records. In another embodiment we select those patterns which occur multiple times in the complete set of historical game records. For example, in a preferred embodiment, we select any pattern which occurs more than once in the complete set of game records. However, it is also possible to select only those patters which occur 2 or more times; or 3 or more times and so on. This is based on the consideration that if a pattern is observed more than once in the training sample then it is likely to be observed (and hence useful) in new board configurations. Any suitable selection criteria can be used.

For example, we used a training set made up of 181,000 Go games, each game having about 250 moves. We used a set of 14 different pattern templates giving about 600 million patterns at our disposal (181,000×250×14=635,500,000). Of these we selected those patterns that appear as a move at least twice in the collection. This enabled us to retain about 2% (about 12 million) of the observed patterns and discard around 98% of those. However, these figures are examples only; other suitable sizes of collection and selection rates can be used.

With huge numbers (e.g. 600 million) of patterns at our disposal it is a difficult task to identify those patterns which occur at least twice in the collection. Even if enough memory is available to store the 600 million patterns there is an efficiency issue to go through this list to find patterns occurring at least twice. This problem is general in that it is not specific to GO moves or moves of other games. Any situation in which there are a large number of records from which it is required to select a sub-set on the basis of a non-trivial criterion is applicable.

In order to address this problem we use a Bloom filter approach. Bloom filters are described in Bloom, B H (1970) "Space/time trade-offs in hash coding with allowable errors", Communications of the ACM, 13, 422-426. A Bloom filter can be used to test whether an element is a member of a set using a space-efficient probabilistic data structure. It is asymmetric in the sense that false positives are possible but false negatives are not. So in the case of selecting GO move patterns which occur twice or more, a false positive involves selecting a pattern in error when it actually occurs only once in the collection. A false negative involves rejecting a pattern which should have been selected. In our GO, and other game situations, we recognize that it is much more valuable to prevent false negatives than to prevent false positives and so Bloom filters are suitable in this respect. Because there are relatively few patterns which occur twice or more we prefer to retain all such patterns. Having said that, other embodiments in which selection methods do make false negatives can be used.

In an example we use a spectral Bloom filter which is an extension of the original Bloom filter to multi-sets, allowing the filtering of elements whose multiplicities are below a threshold given at query time. Spectral Bloom filters are described in "Spectral Bloom filters", Saar Cohen, Yossi Matias, Proceedings of the 2003 ACM SIGMOD international conference on Management of Data, 241-252, 2003.

When a pattern is found in the historical game records then it is first tested if that pattern has been stored in the Bloom filter before. If it has, then the current occurrence must be at least the second time that the pattern is observed and we can add it to our collection (e.g., store it in a hash table). If it has not been previously stored in the Bloom filter, we store it and move on to the next pattern.

Board and Pattern Representation

We represent the Go board as a lattice $\zeta:=\{1, \ldots, N\}^2$ where N is the board size and is usually 9 or 19 g. In order to represent patterns that extend across the edge of the board in a unified way, we expand the board lattice to include the off-board areas. The extended board lattice is $$\hat{\zeta} := \{\vec{v} + \vec{\Delta} : \vec{v} \in \varsigma, \vec{\Delta} \in D\}$$

where the offset vectors are given by $D:=\{-(N-1), \ldots, (N-1)\}^2$ and we will use the notation $\vec{v}:=(v_x, v_y)$ to represent 2-dimensional vertex vectors. We define a set of "colors" $C:=\{b,w,e,o\}$ (black, white, empty, off). Then a board configuration is given by a coloring function $c:\hat{\zeta} \to C$ and we fix the position for off-board vertices $$\forall \vec{v} \in \hat{\zeta} \setminus \varsigma : c(\vec{\Delta}) = o.$$

Our analysis is based on a fixed set $\mathcal{T}$ of pattern templates $T \subseteq \mathcal{T}$ on which we define a set $\Pi$ of patterns $\pi:T \to C$ that are used to represent moves made in a given local context. The patterns preferably have the following properties:

The pattern templates T are rotation and mirror symmetric with respect to their origin, i.e. we have that $(v_x, v_y) \in T \Rightarrow (-v_x, v_y) \in T$ and $(v_y, -v_x) \in T$, thus displaying an 8-fold symmetry.

Any two pattern templates $T, T' \in \mathcal{T}$ satisfy that either $T \subset T'$ or $T' \subset T$. For convenience, we index the templates $T \in \mathcal{T}$ with the convention that $i < j$ implies $T_i \subset T_j$, resulting in a nested sequence (see FIG. 3).

We have $$\pi\begin{pmatrix}\vec{0}\end{pmatrix} = e$$

for all patterns cause for each pattern to represent a legal move the centre point must be empty.

The set of patterns $\Pi$ is closed under rotation, mirroring and color reversal, i.e. if $\pi \in \Pi$ and $\pi'$ is such that it can be generated from $\pi$ by any of these transformations then $\pi' \in \Pi$. In this case, $\pi$ and $\pi'$ are considered equivalent, $\pi \sim \pi'$, and we define a set $\tilde{\Pi}$ of equivalence classes if $\tilde{\pi} \subset \Pi$.

Note that $\tilde{\Pi}$ is a partition of $\Pi$ and thus mutually exclusive, $I_{\tilde{\pi} \in \tilde{\Pi}} \tilde{\pi} = \emptyset$, and exhaustive, $Y_{\tilde{\pi} \in \tilde{\Pi}} \tilde{\pi} = \Pi$.

We say that a pattern $\pi \in \Pi$ matches configuration c at vertex $\vec{v}$ if for all $$\vec{\Delta} \in T(\pi)$$

we have $$c(\vec{v} + \vec{\Delta}) = \pi(\vec{\Delta}).$$

Note that $T(\pi)$ is the template for the pattern $\pi$. We say that pattern class $\tilde{\pi} \in \tilde{\Pi}$ matches configuration c at vertex $\vec{v}$ if one of its constituent patterns $\pi \in \tilde{\pi}$ matches c at $\vec{v}$.

Local Features

In order to extend the predictive power of the smaller patterns and hence improve generalization we optionally incorporate one or more additional features into each pattern. For example, one or more of the following local features of a move can optionally be used:

Liberties of new chain (2 bits). The number of liberties of the chain of stones we produce by making the move. In a preferred embodiment we limit the values of this local features to being any of $\{1, 2, 3, >3\}$. However, this is not essential, any suitable values for this local feature can be used. The number of 'liberties' of a chain of stones is the lower bound on the number of opponent moves needed to capture the chain.

Liberties of opponent (2 bits). The number of liberties of the closest opponent chain after making the move. Values are preferably, but not essentially any of $\{1, 2, 3, >3\}$.

Ko (1 bit). Is there an active Ko on the board? A 'Ko' is a move which is illegal because it would cause an earlier board position to be repeated.

Escapes atari (1 bit). Does this move bring a chain out of Atari? A chain is in 'atari' if it can be captured immediately.

Distance to edge (2 bits). Distance of move to the board edge. Values are preferably but not essentially selected from $\{<3, 4, 5, >5\}$.

We define the set of labels of these features as $F=\{1, \ldots, 8\}$.

Given a move $\vec{v}$ in position c the function $f_c: F \times \zeta \rightarrow \{1,0\}$ maps each feature to its binary true/false value. It is worth noting that for the larger patterns these features are already seen in the arrangement of stones within the template region so the larger patterns are less likely to be altered by the addition of these features.

Pattern Matching and Storing

In a preferred embodiment we do not use an explicit representation of the patterns but define a hash key for patterns and store their properties in a hash table. However, it is not essential to do this. The pattern properties can be stored in any suitable manner or alternatively the patterns themselves can be stored together with their properties. In the hash key example, we advantageously adapt a Zobrist hashing method (Zobrist, A. 1990 "A new hashing method with applications for game playing". ICCA Journal, 13, 69-73), which has the advantage that it can be updated incrementally. For example, we generate four sets of 64 bit random numbers, $h_a: \tilde{\zeta} \rightarrow \{0, \ldots, 2^{64}-1\}, a \in C$, four for each vertex in the extended Go lattice $\tilde{\zeta}$. We also generate a random number for each of the local features $l: F \rightarrow \{0, \ldots, 2^{64}-1\}$. The hash-key $k(\pi, \vec{v}, c)$ of a given pattern $\pi$ vertex $\vec{v}$ in board configuration c can be calculated by XORing together the corresponding random numbers, a. $k(\pi, \vec{v}, c) := k_\pi \oplus k_{\vec{v}, c}$, where, b. $k_\pi := \displaystyle\bigoplus_{\vec{\Delta} \in T(\pi)} h_\pi(\vec{\Delta})$, c. $k_{\vec{v}, c} := \displaystyle\bigoplus_{i \in F} l(i) f_c(i, \vec{\Delta})$.

Both adding a stone and removing a stone of color $a \in \{b, w\}$ at position $\vec{v}$ correspond to the same operation $k_\pi \leftarrow k_\pi \oplus h_a$. Due to the commutativity of XOR the hash-key can be calculated incrementally as stones are added or removed from a pattern. However, we prefer to store the pattern classes $\tilde{\pi}$ instead of single patterns $\pi$ to take account of the relevant symmetries. This is achieved by choosing $\tilde{k}_{\tilde{\pi}} := \min_{\pi \in \tilde{\pi}}$, i.e. by calculating the hash-key for every symmetry variant of the pattern and choosing the minimum of those hash-keys. (It is not essential to choose the minimum; any particular one of the hash-keys can be selected e.g. the maximum, as long as a consistent selection method is used in creation of the hash table.) The resulting hash-table allows us to store and retrieve information associated with each pattern without an explicit representation of the pattern itself. This could be the game-record the move was found in or relevant statistics, such as the percentage of games won after playing that move.

Pattern Harvesting

A particular example of pattern harvesting is now described in detail.

From a database of Go game records we harvest pattern classes $\tilde{\pi}$ corresponding to moves made by expert players. We let the computer play through each of the games in the collection and maintain a $|T| \times |\tilde{\zeta}|$-table H of hash-keys corresponding to each of the pattern templates $T_i$ at each of the vertices $\vec{v} \in \tilde{\zeta}$. The update after each move makes sure that if pattern class $\tilde{\pi}$ matches the resulting configuration c at vertex $\vec{v}$ then $H_{a, \vec{v}} = \tilde{k}(\tilde{\pi})$. Whenever an entry in H changes, the new hash-key can be used to mark that pattern as being present in the collection.

A rough estimate shows that for 181,000 games records with an average length of 250 moves and $|T|=14$ different pattern templates we have about 600 million patterns at our disposal. To limit storage requirements and to ensure generalization to as yet unseen positions we only want to include in Π those patterns that appear as a move made by an expert twice in the collection. We use a Bloom filter (Bloom, 1970) B to mark of patterns that have been seen at least once. For every pattern we observe we use B to check if it is new; if it is, we add it to B. If B indicates that the pattern has been seen before we increment the count in our pattern hash-table $D_{\tilde{\Pi}}$ that represents $\tilde{\Pi}$.

Learning from the Harvested Patterns or Harvested Pattern Classes

Once the patterns have been harvested we carry out a learning process to either learn an urgency value for each pattern class, or to learn a play probability for each pattern class. It is also possible to learn these factors for individual patterns as opposed to pattern classes.

The term "urgency" is used herein to refer to a latent variable, not directly observable, which provides an indication of the quality (or goodness) of playing a move (or pattern class).

In the case that we learn an urgency value for each pattern class a method of learning is now described with reference to FIG. 11. We use a probability distribution (such as a Gaussian or other distribution) to represent our belief about the urgency value of a particular pattern class. In a preferred embodiment we use a Gaussian belief distribution which is uniquely described by its mean and standard deviation. The area under a Gaussian belief distribution within a certain range corresponds to the belief that the urgency value will lie in that range. As the system learns more from the game records, the standard deviation has the tendency to become smaller, more tightly bracketing the urgency for the pattern class. Another way of thinking about the mean and standard deviation values is to consider them as the "average belief in the quality of a move or pattern class" and "the uncertainty" associated with the assessment of that quality, respectively.

Figure 11:
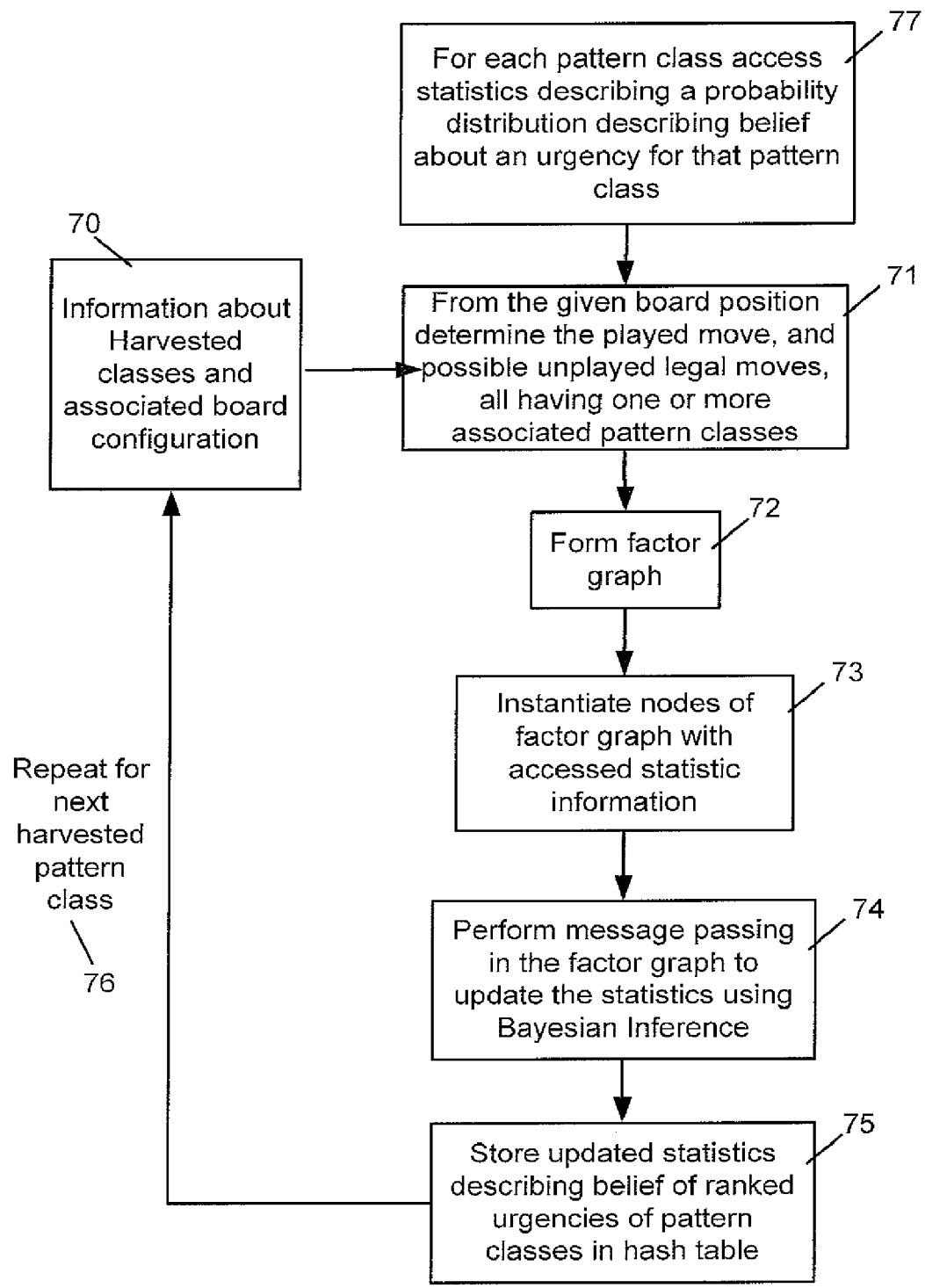
FIG. 11 is a flow diagram of a method of learning urgencies of pattern classes.

In FIG. 11 an example of our method for determining an indication of an urgency of a move (or pattern class) given a particular board configuration is described. The method involves, for each pattern class, accessing statistics (see box 77) describing a probability distribution over legal moves in a given board configuration. In a preferred embodiment we use one-dimensional Gaussian distributions to represent urgency belief. By using Gaussian distributions we achieve the advantage that such distributions can be uniquely described by two statistics, the mean and standard deviation, as explained above. In addition, the sum of two Gaussian random variables is itself a Gaussian random variable which enables us to simplify our computations. However, it is not essential to use Gaussian distributions to represent urgency belief.

If a pattern class has been analyzed before using our learning process and we have stored urgency information for that pattern class, that information is accessed. In the case of a new pattern class we use a default urgency belief distribution with associated default statistics, for example an initial mean of 0 and standard deviation of 1. Any suitable default belief distribution is used.

Information about the harvested pattern classes is obtained (see box 70) including an associated board configuration for each harvested pattern class. For a given harvested pattern class (and board configuration) we determine other possible legal moves, each having an associated pattern class (see box 71). Information about the rules of the game is used to determine the other possible legal moves.

We know that the harvested pattern class was played and that the other possible legal moves (here pattern classes) were not played. This information together with the statistics is used to form a factor graph (see box 72). The factor graph comprises nodes associated with particular pattern classes, those nodes being ordered on the basis of which pattern class was played and which pattern classes were not played. Some nodes of the factor graph are instantiated with the accessed statistics information (see box 73). Message passing is then performed over the factor graph to update the statistics thus carrying out Bayesian inference (see box 74). The resulting updated statistics describe our belief of the relative urgencies of the pattern classes and these results are stored (see box 75) for example, in a hash table or other suitable store. This process is repeated (see 76) for further harvested pattern classes.

Figure 9:
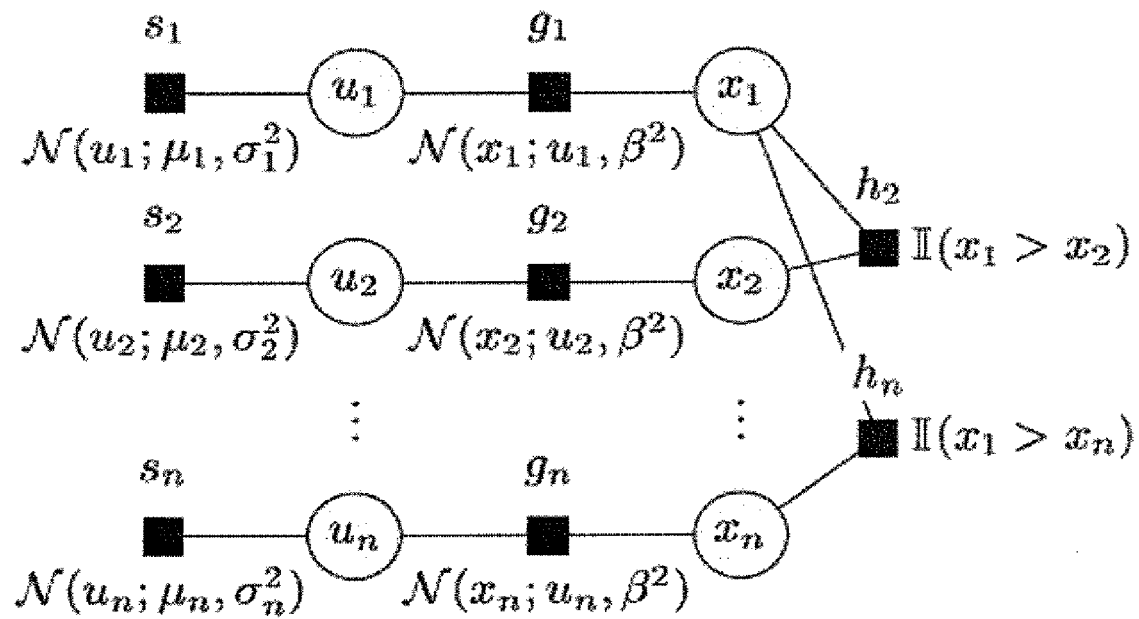
FIG. 9 is an example factor graph for three potential game moves, one of which is chosen by a player, the factor graph represents a ranking model.

More detail about the process of forming the factor graph is now given with reference to FIG. 9. The factor graph comprises nodes connected by links. The nodes are either variable nodes (circles) or factor nodes (squares). Variable nodes represent storage locations and factor nodes represent computational units. The factor nodes read and write information from and to their neighboring variable nodes, respectively, according to calculation rules described later.

In FIG. 9 each row of nodes relates to a particular pattern class with the upper most row relating to the pattern class corresponding to the played move and the other rows of nodes relating to pattern classes corresponding to legal but un-played moves for the same board configuration. The factor graph can be drawn in any suitable manner to capture these relationships, for example, using columns for each pattern class rather than rows. As illustrated in FIG. 9 the factor graph is preferably acyclic. Preferably it comprises two types of nodes, variable nodes and factor nodes, and it is bipartite, i.e, the only permissible type of connection is between a factor node and a variable node.

The factor nodes labeled s1, s2, . . . sn are functions which access a database or other store to obtain belief distributions for each pattern class (or use as a default distribution in the case of new pattern classes). These computational units feed the parameters describing the urgency belief distributions into the corresponding variable nodes. For example, in the case of Gaussian distributions there would be two parameters stored in each variable node. The next column of variable nodes, that is the circular nodes u1, u2 . . . un represent the urgencies of the pattern classes. These nodes each store the statistics describing the belief distribution for the associated pattern class. The next column of factor nodes are computation units g1, g2 . . . gn which compute the distribution corresponding to the effective urgency value in the observed configuration. and feed the parameters into the corresponding variable nodes x1, x2 . . . xn. The remaining factor nodes h2, . . . hn encode which pattern class was played. These are order factor nodes which implement an order constraint indicating that the effective urgency value of the move made must have been greater than the effective urgency values of the moves not played. For these nodes the associated update equations are not exact as the true factor-to-variable messages are no longer Gaussian. The other factor nodes of FIG. 5 are exact factor nodes because their associated messages can be computed and represented exactly.

The process of message passing comprises carrying out a calculation associated with a computation node (square node of FIG. 9) using distribution parameters from neighboring variable nodes and passing the results to one of the neighboring variable nodes (circular nodes in FIG. 9). The direction of passing the results (also referred to as a processing schedule) is explained in more detail now with reference to FIG. 10.

Figure 10:
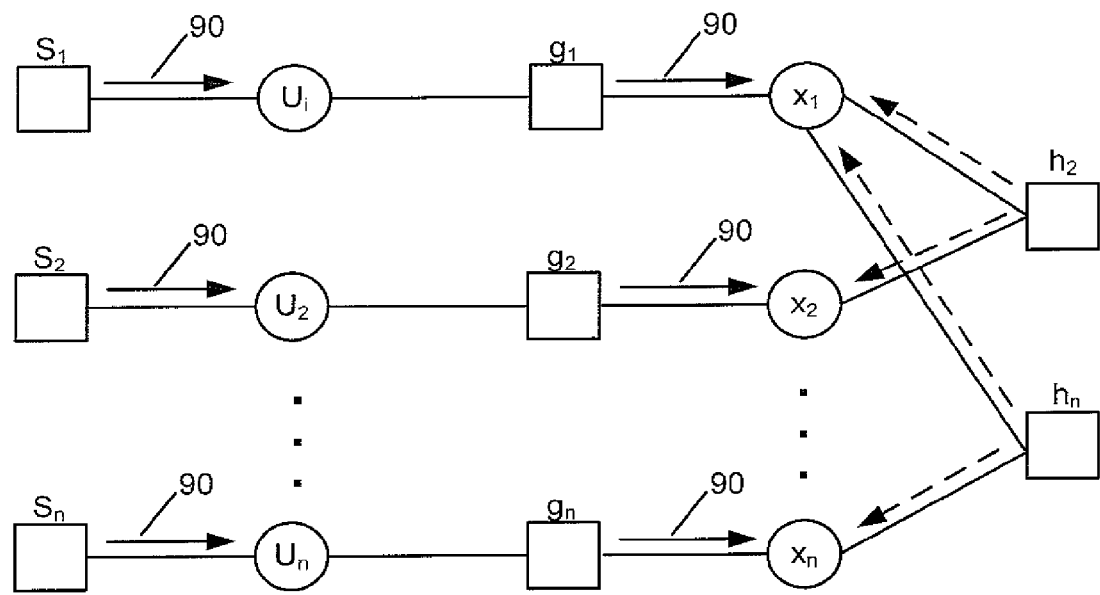
FIG. 10 shows the factor graph of FIG. 5 with arrows indicating scheduling.

The processing schedule is preferably divided into three phases: pre-processing, chain processing and post processing. An example pre-processing schedule is illustrated by arrows 90 in FIG. 10. Starting at initial factor nodes s1, s2, ... sn computation proceeds along the rows until nodes x1, x2, ... xn are reached. The post processing schedule is the reverse of the pre-processing schedule but stopping at the variable nodes u1, u2, ... un which may then contain the quantity of interest. After pre-processing a processing schedule is iterated until the belief distributions converge or stop changing. An example schedule is indicated in FIG. 10 using dotted arrows. When convergence is reached or substantially reached, then the post processing phase passes the distributions back to the left of the rows to obtain the new urgency statistics. Each arrow in the processing schedule represents a non trivial calculation and details of those calculations are given below.

We present general update equations for use in carrying out the computations along the arrows in the message passing process. We tailor those general update equations for use with Gaussian distributions as shown.

Factor Node Update with Gaussian Messages

Figure 15:
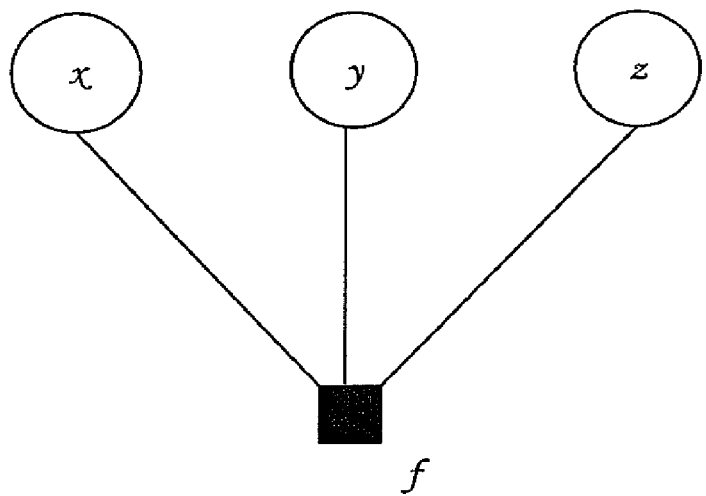
FIGS. 15 to 19 are example factor graphs.
Figure 15:
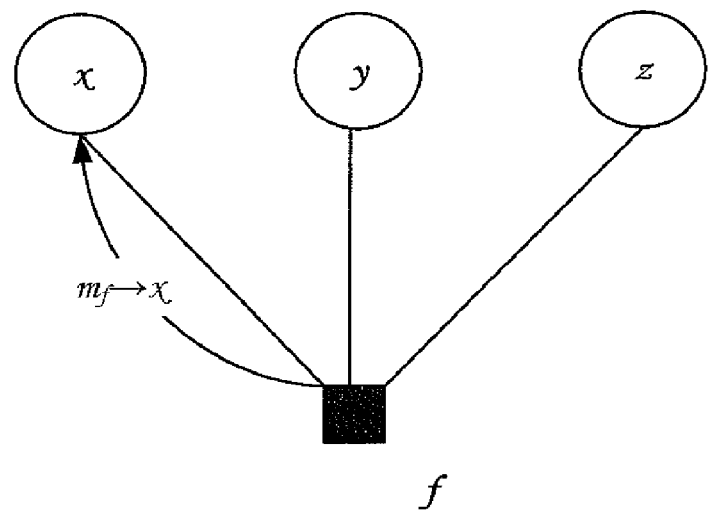

Consider the example of factor graph of FIG. 15.

Suppose we would like to update the message $m_{f\to x}$ and the marginal distribution $p_x$. Then, the general update equations are as follows:

$$m_{x\to f}(x) \propto \frac{p_x(x)}{m_{f\to x}(x)},$$

$$m_{f\to x}^{true}(x) \propto \int\int f(x,y,z) \cdot \frac{p_y(y)}{m_{f\to y}(y)} \cdot \frac{p_z(z)}{m_{f\to z}(z)} dy\,dz,$$

$$p_x(x) = MM[m_{f\to x}^{true}(x)m_{x\to f}(x)],$$

$$m_{f\to x}(x) \propto \frac{p_x(x)}{m_{x\to f}(x)},$$

where MM[·] returns the distribution in the Gaussian family with the same moments as the argument and all quantities on the right are normalized to be distributions. In the following we use the exponential representation of the Gaussian, that is, $$G(x;\tau,\pi) \propto \exp(\pi x^2 - 2\tau x)$$

This density has the following relation to the standard density $$\mathcal{G}(x;\tau,\pi) := \mathcal{N}\left(x; \frac{\tau}{\pi}, \frac{1}{\pi}\right), \text{ or } \mathcal{N}(x;\mu,\sigma^2) := \mathcal{G}\left(x; \frac{\mu}{\sigma^2}, \frac{1}{\sigma^2}\right)$$

In the case of the exact factor nodes the update equations are given in the following table.

Figure 16:
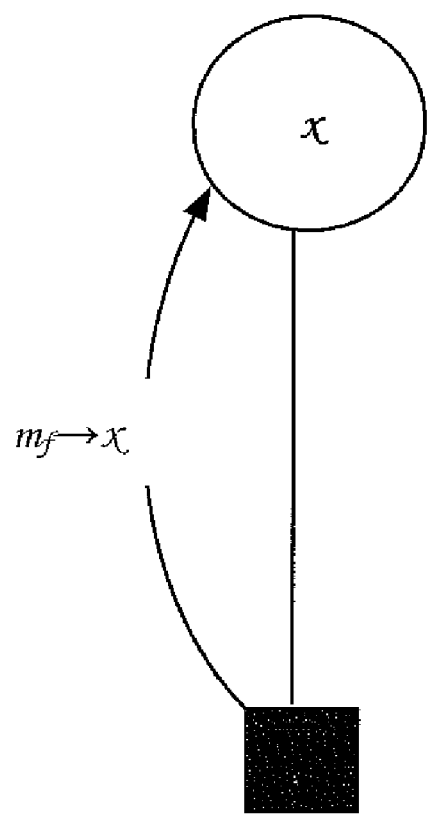
Figure 17:
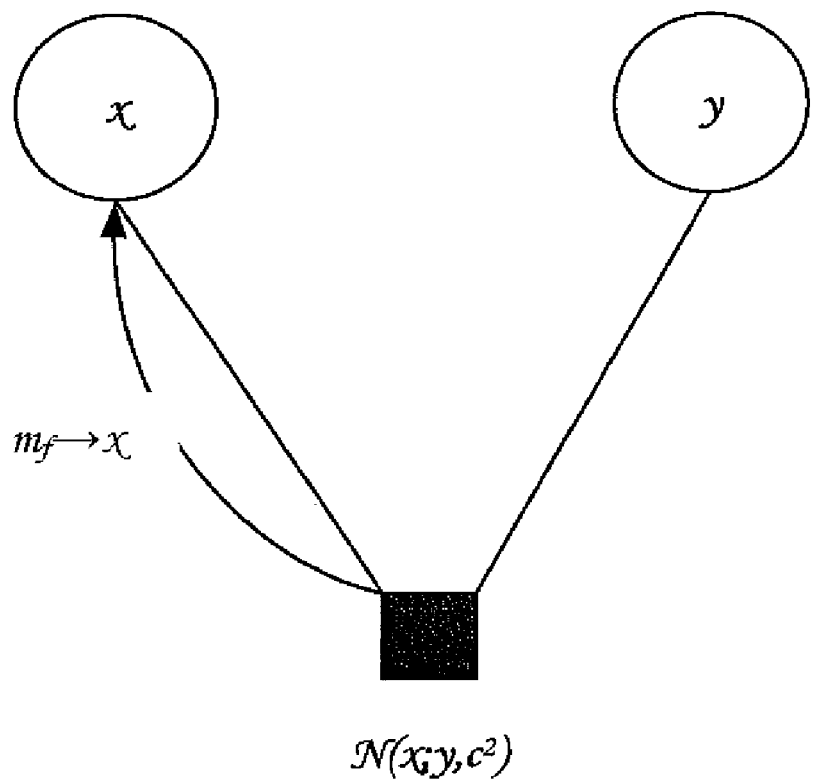
Figure 18:
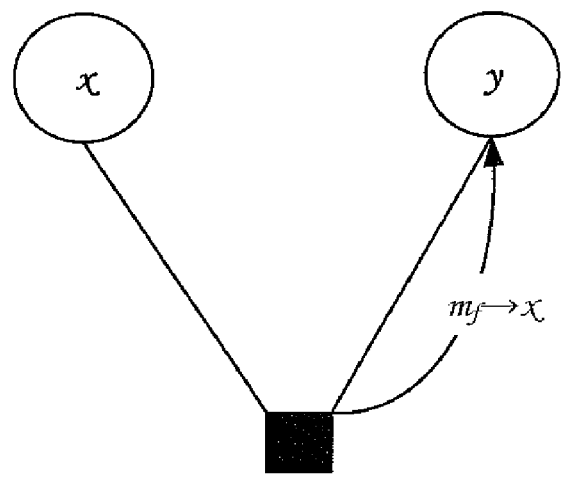
Figure 18:
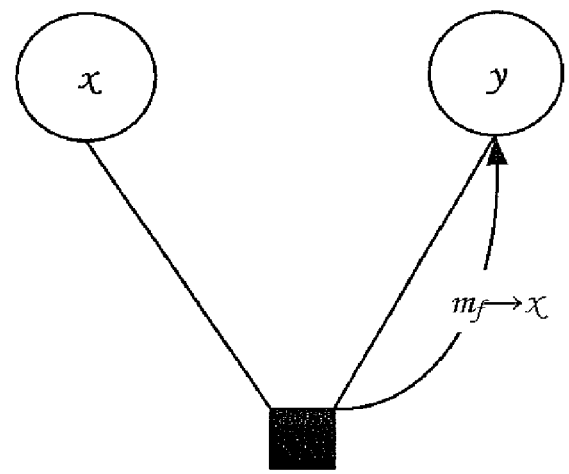

| Factor | Update equation |
|---|---|
| 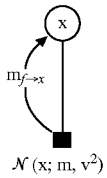<br>$\mathcal{N}(x; m, v^2)$<br>Corresponds to FIG. 16 | $\pi_x^{new} \leftarrow \pi_x + \frac{1}{v^2}$<br>$\tau_x^{new} \leftarrow \tau_x + \frac{m}{v^2}$<br>This is exact and should only be executed once. |
| 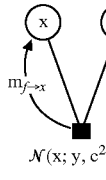<br>$\mathcal{N}(x; y, c^2)$<br>Corresponds to FIG. 17 | $\pi_{f\to x}^{new} \leftarrow a(\pi_y - \pi_{f\to y})$<br>$\tau_{f\to x}^{new} \leftarrow a(\tau_y - \tau_{f\to y})$<br>$\pi_x^{new} \leftarrow \pi_x + \pi_{f\to x}^{new} - \pi_{f\to x}$<br>$\tau_x^{new} \leftarrow \tau_x + \tau_{f\to x}^{new} - \pi_{f\to x}$<br>$a := \frac{1}{1 + c^2(\pi_y - \pi_{f\to y})}$ |
| <br>$\mathcal{N}(x; y, c^2)$<br>See FIG. 18 | |
| 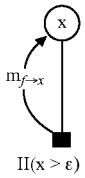<br>$\mathcal{N}(y; x, c^2)$<br>See FIG. 18 | |

In the case of the order factor nodes, the update equations are given in the following table.

Figure 19:
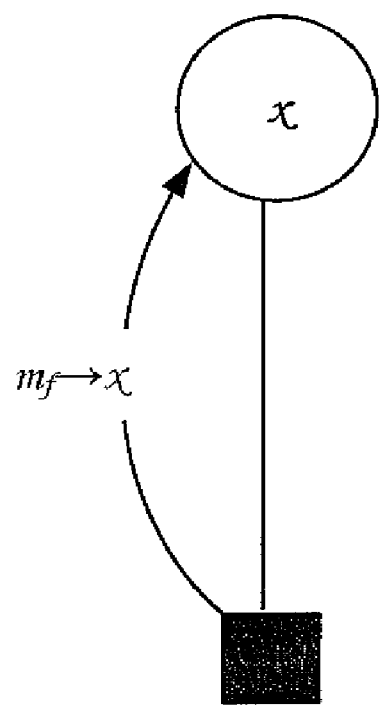

| Factor | Update equation |
|---|---|
| 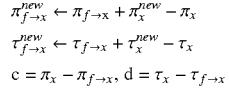<br>$\mathbb{I}(x > \varepsilon)$<br>Corresponds to FIG. 19 | $\pi_x^{new} \leftarrow \frac{c}{1 - w\left(\frac{d}{\sqrt{c}}, \varepsilon\sqrt{c}\right)}$<br>$\tau_x^{new} \leftarrow \frac{d + \sqrt{c} \cdot v\left(\frac{d}{\sqrt{c}}, \varepsilon\sqrt{c}\right)}{1 - w\left(\frac{d}{\sqrt{c}}, \varepsilon\sqrt{c}\right)}$<br>$\pi_{f\to x}^{new} \leftarrow \pi_{f\to x} + \pi_x^{new} - \pi_x$<br>$\tau_{f\to x}^{new} \leftarrow \tau_{f\to x} + \tau_x^{new} - \tau_x$<br>$c = \pi_x - \pi_{f\to x}, d = \tau_x - \tau_{f\to x}$ |

In the update equations set out in the tables above a represents weightings which in a preferred example are set to 1. Also, in the update equations v and w correspond to the functions v(.,.) and w(.,.) given by $$v(t, \alpha) = \frac{N(t-\alpha)}{\Phi(t-\alpha)}$$

$$w(t, \alpha) = v(t, \alpha) \cdot (v(t, \alpha) - (t-\alpha))$$

Where the symbols N and Φ represent the density of the Gaussian distribution function and the cumulative distribution function of the Gaussian, respectively. The symbols t and α are simply arguments to the functions. Any suitable numerical or analytic methods can be used to evaluate these functions such as those described in Press et al., Numerical Recipes in C: the Art of Scientific Computing (2d. ed.), Cambridge, Cambridge University Press, ISBN-0-521-43108-5.

In the example shown in FIG. 10 the message passing during the schedule involves order factor node updates from the nodes h to the nodes x using the update equation of the first row of the order factor node update equation table.

In the case of exact factor nodes, for message passing from a computation node (square node) to a single variable node (circular node) the update equations of the first row of the exact factor node update equation table is used. In the case of message passing from a computation node to two variable nodes the update equations of the second or third row of the table are used as appropriate.

Figure 13:
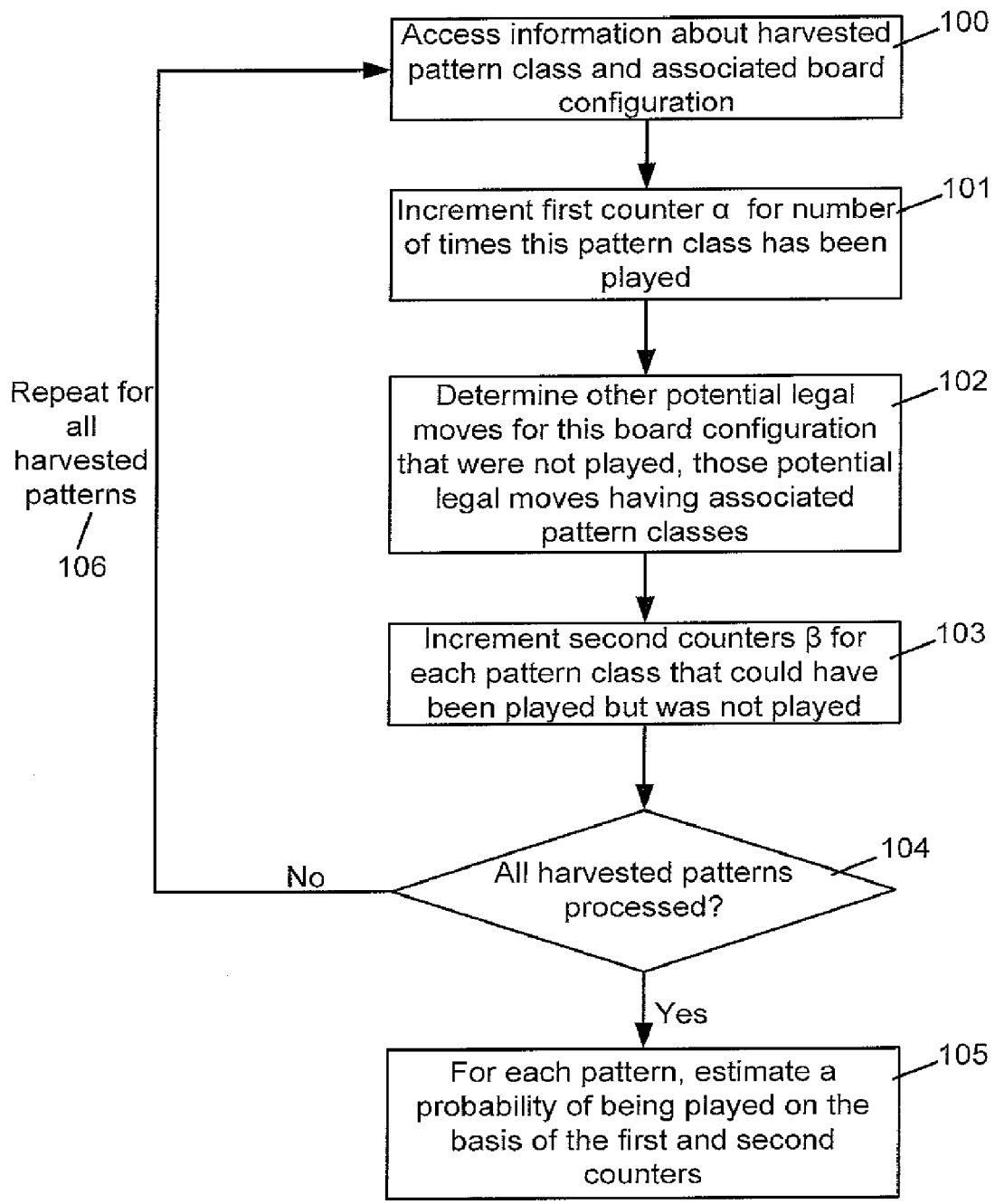
FIG. 13 is a flow diagram of a method of learning probabilities of being played for pattern classes.

In other embodiments we learn a play probability (probability of being played given a particular board configuration) for each pattern class. This is now described with reference with FIG. 13. Information about a harvested pattern class and its associated board configuration is accessed (see box 100). A first counter is then incremented to indicate that this pattern class has been played (see box 101). We determine (using information about the rules of the game) other potential legal moves for the particular board configuration. These potential legal moves were not played. We identify the associated pattern classes for these potential legal moves (see box 102). Second counters are then incremented for each pattern class that could have been played but was not played (see box 103). If all harvested pattern classes have been processed (see box 104) then we proceed to estimate a probability of being played for each pattern class (see box 105). If there are more harvested patterns to process then we repeat the earlier method (see 106 in FIG. 13). The estimate of the probability of being played is made on the basis of the first and second counters (see box 105). The estimates are stored in any suitable manner. A particular example of this method is described in detail below under the heading Independent Bernoulli Model.

Using the Learnt Information to Play Games

Once the learning phase has been completed to learn from the harvested patterns we are able to use the results to select a move or rank possible moves, given a particular board configuration. This is now described with reference to FIG. 12. In some embodiments we learn urgency belief statistics and in other embodiments we learn estimates of probabilities of play. All embodiments involve learning belief distributions.

At a high level, we access the current board configuration, and for each possible board location where the next move could be played (all legal potential play positions) we find any harvested patterns which match. Any suitable pattern matching technique is used. For example, we can search for exact matches only, or allow inexact matches within specified bounds. We then select one of the matched pattern classes on the basis of the learnt urgency belief or play probability information. In a preferred embodiment we carry out the pattern matching process in an order on the basis of the size of the pattern templates. This is not essential but it enables us to give preference to patterns of larger size. It would also be possible to give preference to patterns of a specified size range or patterns having particular characteristics. One could also combine patterns of different sizes.

Figure 12:
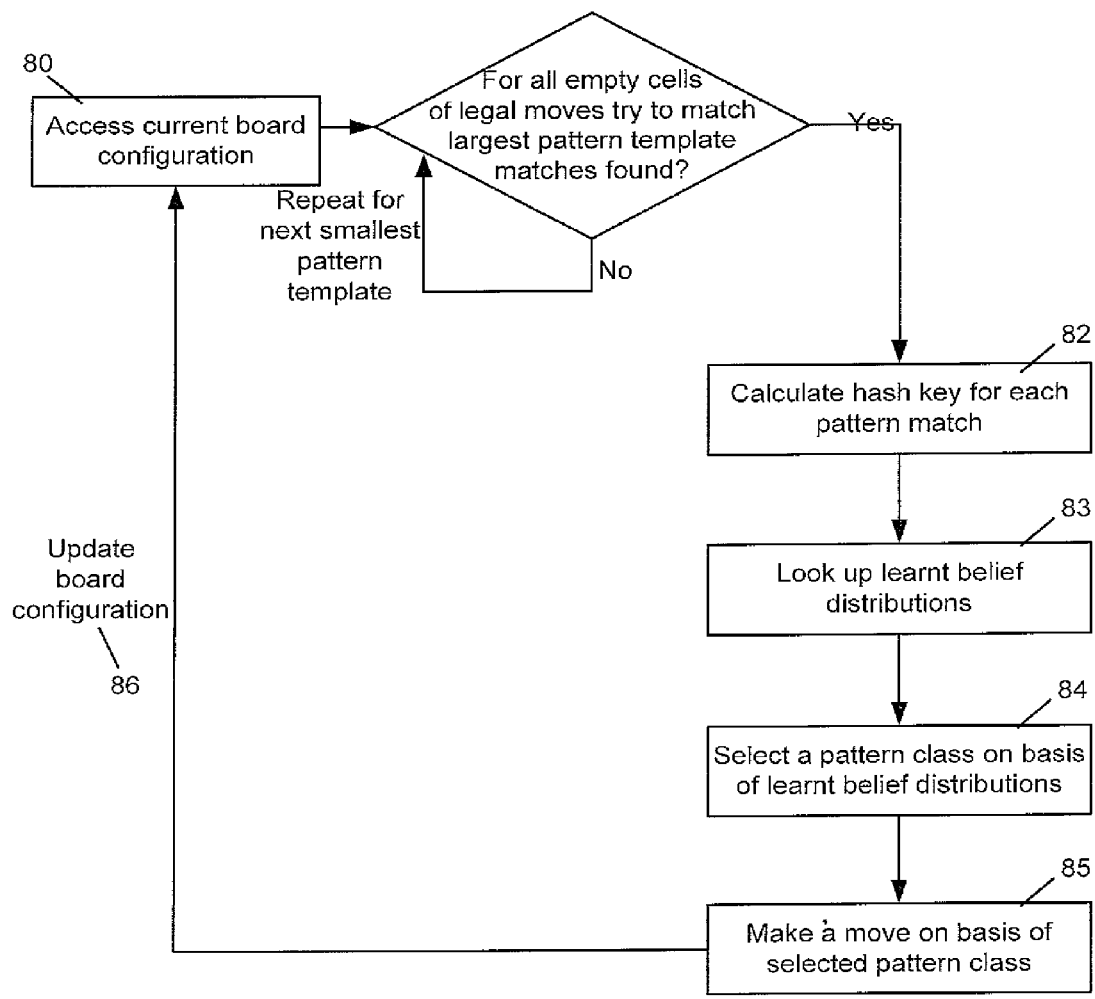
FIG. 12 is a flow diagram of an automated method of playing a game using urgencies of pattern classes.

As shown in FIG. 12 we access the current board configuration (see box 80). This is achieved in any suitable manner via a user interface, or other interface to our automated game system. For each possible board grid location where the next stone could be played (all legal potential play positions) we try to match the largest pattern template in the current board configuration. This is done in any suitable manner. For example, for pattern template 14 there might be no harvested pattern classes which match the current board configuration. We then try the next smallest pattern template (see FIG. 12). This continues until we find a pattern template which has one or more harvested pattern classes which match regions of the current board configuration. We select one of the matched pattern classes for each possible play position in any suitable manner (although there may be some play positions which have no matches). The selection can be arbitrary or on the basis of the learnt information for example. We access the learnt information for the selected matched pattern class. For example, if the learnt information is stored using a hash table, we calculate a hash key for the matched pattern class (see box 82) and then look up the learnt belief distributions (see box 83). We then select (see box 84) one of the matched pattern classes on the basis of the learnt information. The automated system is then able to play the next move of the game on the basis of the selected pattern class (see box 85) and the board configuration is updated (see box 86).

As mentioned above, the learnt information can be used for other purposes besides creating an automated player of a game. For example, the learnt information can be used in study or training tools for those seeking to improve their game playing skills. It can also be provided as input to automated game playing systems which use other approaches such as tree search or Monte Carlo game playing systems.

Figure 14:
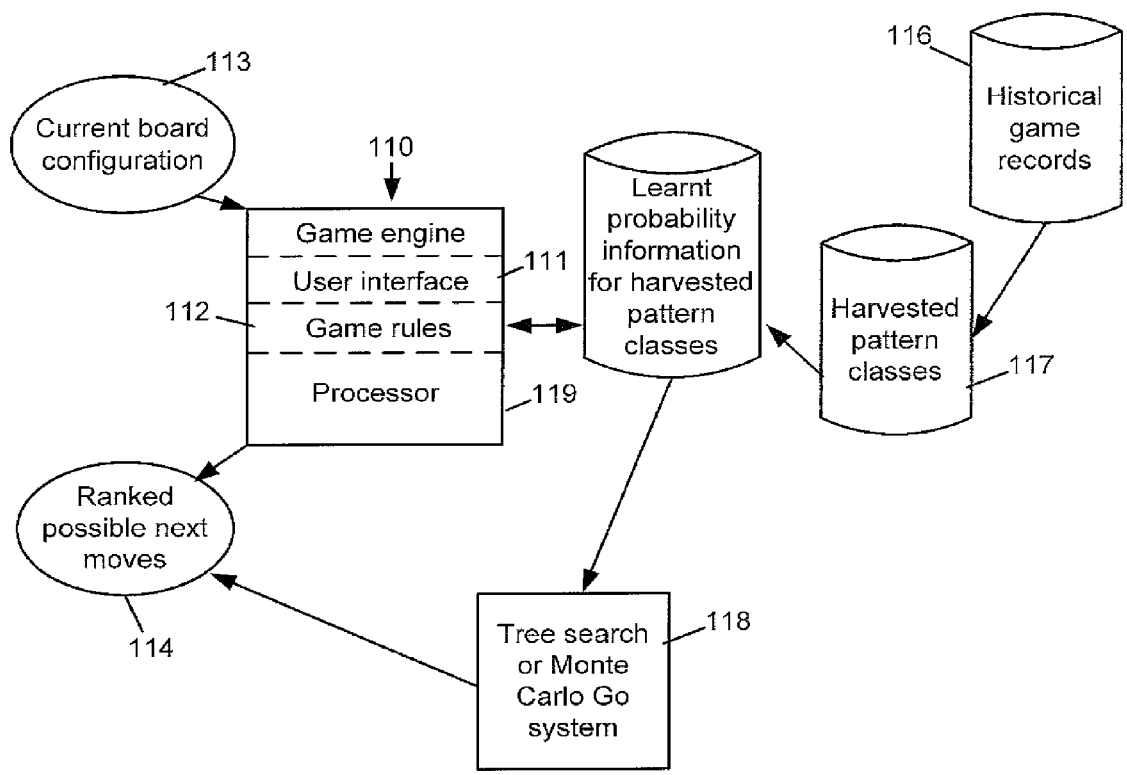
FIG. 14 is a schematic diagram of a game engine as part of a system for playing a game.

FIG. 14 is a schematic diagram of a game engine 110 as part of a system for playing a game. The game engine comprises a user interface 111 of any suitable type such as a graphical user interface arranged to be displayed on a display screen with an associated keyboard or other user input means. Information about the game rules 112 is either stored at the game engine or accessible to the game engine from another entity. A processor 119 is also provided which can be a personal computer, a games console or a computer of any suitable type with software to support and enable the game engine to operate. The game engine is provided as a software application on the personal computer or as dedicated hardware or in any suitable manner as known in the art.

The game engine 110 has an input arranged to receive a current board configuration 113. For example, this can be via the user interface or input received as an email, flat file or any other suitable medium. The game engine 110 also has access to learnt probability information 115 for harvested pattern classes 117 obtained from historical game records 116. The learnt probability information is stored in any suitable manner either integral with the game engine or at another entity in communication with the game engine.

The game engine provides ranked possible next moves 114 as output or one selected next move for play. It can also provide a list of legal moves with associated urgency statistics or probability of play. Optionally the system also comprises a tree search, Monte Carlo game system 118 or other game system which uses techniques different to that of the game engine itself. The learnt probability information 115 and/or the ranked possible next moves 114 are used by that optional game system 118 to tailor or focus the processing of that system.

A preferred embodiment involving urgencies is now described:

Bayesian Pattern Ranking

Model

We now present an example model of the probability $$P(\overset{p}{v} \mid c)$$

of an expert Go player making a move (at vertex) $\overset{p}{v} \in \zeta$ in board configuration c. We only consider legal moves $\overset{p}{v} \in L(c)$, where $L(c) \subseteq \zeta$ is the set of legal moves in configuration c.

A move at $\overset{p}{v}$ in configuration c is represented by the largest pattern $$\tilde{\pi}_{\max}(\overset{p}{v}, c) \in \prod$$

that matches c at $\overset{p}{v}$. In our Bayesian model, we use a Gaussian belief $p(u)=N(u;\mu,\text{diag}(\sigma^2))$ over urgencies $u(\tilde{\pi})$ of pattern classes $\tilde{\pi}$. Then the predictive distribution is given by $$P(\overset{p}{v} \mid c) = \int P(\overset{p}{v} \mid c, u) p(u) du.$$

Our likelihood model $P(\overset{p}{v} \mid c, u)$ is defined via the notion of a latent, unobserved urgency $x(\tilde{\pi})$ for each pattern class, where $p(x \mid u) = N(x:u, \beta^2)$ is also assumed to be Gaussian with mean u and a fixed variance $\beta^2$; the value of $\beta$ expresses the variability of the urgency depending on specific position and player characteristics. In this sense, $\beta$ can also be related to the consistency of play and can be chosen smaller for stronger players. We assume that an expert makes the move with the highest effective urgency value, hence, $$P(v \mid c, u) := P\left(\begin{array}{c} \text{argmax}\left\{x\left(\tilde{\pi}_{\max}\left(\overset{p}{v'}, c\right)\right)\right\} = \overset{p}{v} \\ \tilde{v}' \in L(c) \end{array}\right) \quad (1)$$

This model can be expressed as a factor graph of the type shown in FIG. 9. The probability (1) can be efficiently calculated by Expectation Propagation (EP) message passing in factor graphs.

Learning and Inference

A goal of learning is to determine the parameters $\mu$ and $\sigma^2$ of the belief distribution $p(u)=N(u; \mu, \text{diag}(\sigma^2))$ from training data. The Bayesian posterior is given by $$p(u \mid \overset{p}{v}, c) = \frac{P(\overset{p}{v} \mid c, u) p(u)}{P(\overset{p}{v} \mid c)}.$$

In general, this posterior is no longer a Gaussian and has non-zero covariance. We use a local assumed density filtering to approach where we seek the best (diagonal) Gaussian approximation $$q(u \mid \overset{p}{v}, c)$$

to the posterior $$P(u \mid \overset{p}{v}, c)$$

in the sense of minimum Kullback-Leibler divergence when leaving out one factor from $$P(\overset{p}{v} \mid c, u).$$

Once a move at vertex $\overset{p}{v}$ at configuration c has been incorporated into the prior p(u), the posterior $$p(u \mid \overset{p}{v}, c)$$

is based as the prior for the next expert move at the new board configuration. Again inference can be performed efficiently using EP message passing.

The factor graph (see FIG. 5) expresses the joint distribution $$p(\overset{\varpi}{v}, u, x \mid c):$$

$$p(\overset{\varpi}{v}, u, x \mid c) = \prod_{i=1}^{n} s_i(u_i) \prod_{j=1}^{n} g_j(x_j, u_j) \prod_{k=2}^{n} h_k(x_1, x_k),$$

where $s_i(u_i) = N(u_i; \mu_i, \sigma_i^2),$ $g_j(x_j, u_j) = N(x_j; u_j, \beta^2),$ $h_k(x_1, x_k) = \Pi(x_1 > x_k).$ We are interested in determining the marginals $p(u_i)$ of the joint distribution defined above. This can be accomplished by a sum-product algorithm. Examples of such an algorithm are given in Jordan & Weiss, 2002 "Graphical models: probabilistic inference". In M. Arbib (Ed.), Handbook of neural networks and brain theory. MIT Press. $2^{nd}$ edition.

For any variable, $v_i$, connected to its neighboring factors, $f_k \in \text{neigh}(v_i)$, the marginal distribution of $v_i$ is given by $$p(v_i) = \prod_{f_k \in neigh(v_i)} m_{f_k \to v_i}(v_i) \quad (2)$$

where $m_{f_k \to v_o}(v_i)$ denotes a 'message' function passing from factor $f_k$ to variable $v_i$. Messages are calculated as follows to perform exact inference on a factor tree. For notational convenience, we only state the factor-to-variable message equation for the first variable, $v_o$.

$$m_{f_k \to v_o}(v_o) = \int f_k([v_o; v]) \prod_{j=1}^{n} m_{v_j \to f_k}(v_j) dv, \quad (3)$$

$$m_{v_i \to f_k}(v_i) = \prod_{j \in neigh(v_i) \setminus \{f_k\}} m_{f_k \to v_j}(v_j). \quad (4)$$

These equations derive from the fact that we can make use of the conditional independence structure of the joint distribution to rearrange the marginalization integral and thus simplify it.

We make the approximation that all messages are Gaussian densities to reduce storage requirements (messages can be represented by two numbers) and to simplify the calculations. For factors $f_k$ of general form, the factor-to-variable message calculated by (3) are not necessarily Gaussian. Therefore we approximate these messages by a Gaussian which minimizes the Kullback-Leibler divergence between the marginal distribution, $p(v_i) = m_{f_k \to v_i}(v_i) \cdot m_{v_i \to f_k}(v_i)$, and its Gaussian approximation, $q(v_i) = \hat{m}_{f_k \to v_i}(v_i) \cdot m_{v_i \to f_k}(v_i)$ where $\hat{m}_{f_k \to v_i}(v_i)$ is the approximate (Gaussian) message from factor $f_k$ to variable $v_i$. That is, $$\hat{m}_{f_k \to v_i}(v_i) = \frac{MM[m_{f_k \to v_i}(v_i) \cdot m_{v_i \to f_k}(v_i)]}{m_{v_i \to f_k}(v_i)} \quad (5)$$

where MM denotes 'Moment Match'.

The goal of learning is to determine (from training data) the parameters $\mu_i$ and $\sigma_i^2$ of the belief distribution $p(u_i) = N(u_i; \mu_i, \sigma_i^2)$ for the value of each pattern. We calculate the posterior $$p(u \mid \vec{v}, c)$$

by first propagating messages about the graph according to (3), (4) and (5) until convergence. The approximate posterior distributions we require are $$p(u_i) = m_{g_j \to u_i}(u_i) \cdot m_{g_j \to u_i}(u_i) \quad (6)$$

Once a move at vertex $\wp$ at configuration c has been incorporated into the prior $p(u)$, the posterior $$p(u \mid \vec{v}, c)$$

is used as the prior for the next expert move at the new board configuration. This approach is a form of assumed-density filtering, Independent Bernoulli Model We also consider an alternative approach where we assume that each pattern class is played independently of the other available pattern classes with probability $$p^\wp_{v,c} := p(\tilde{\pi}_{max}(\vec{v}, c))$$

(the probability of the maximal pattern class matched at vertex $\wp$ in configuration c). The probability of a move at location $\wp$ in position c given the pattern probabilities, p, is $$p(\vec{v} \mid c, p) = p^\wp_{v,c} \cdot \prod_{v' \in L(c) \setminus \wp} \left(1 - p^\wp_{v',c}\right).$$

Our uncertainty on the $p^\wp_{,c}$ is modeled by a conjugate Beta prior $p(p^\wp_{,c}) = Beta(p^\wp_{,c}; \alpha^\wp_{,c}, \beta^\wp_{,c})$ so the marginal probability of a move $$p(\vec{v} \mid c, \alpha, \beta)$$

is $$\int p(\vec{v} \mid c, p) \prod_{v' \in L(c)} Beta\left(p_{\wp_{v',c}}; \alpha_{\wp_{v',c}}, \beta_{\wp_{v',c}}\right) dp =$$

$$\frac{\alpha_{\wp_{v,c}}}{\alpha_{\wp_{v,c}} + \beta_{\wp_{v,c}}} \cdot \prod_{v' \in L(c) \setminus \wp} \left(1 - \frac{\alpha_{\wp_{v',c}}}{\alpha_{\wp_{v',c}} + \beta_{\wp_{v',c}}}\right),$$

where $\alpha^\wp_{,c}$ corresponds to the number of times this pattern class $$\tilde{\pi}_{max}(\vec{v}, c)$$

matched for a move played by an expert in the training data and $\beta^\wp_{,c}$ corresponds to number of times the pattern class matched $$\tilde{\pi}_{max}(\vec{v}, c)$$

for moves that were available but not chosen.

Those skilled in the art will realize that storage devices utilized to store program instructions can be distributed across a network. For example, a remote computer may store an example of the process described as software. In particular, the game engine and scoring system can be provided at a central location accessible by remote game terminals over any suitable communications network. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices Any range or device value given herein may be extended or altered without losing the effect sought, as will be apparent to the skilled person.

The steps of the methods described herein may be carried out in any suitable order, or simultaneously where appropriate.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method of scoring a board configuration of a game comprising:
  under control of a computer configured with computer-executable instructions to implement the method of scoring the board configuration of the game,
  (i) selecting an empty board position corresponding to a legal move of a player whose move is next;
  (ii) executing a move at the selected board position according to the rules of the game;
  (iii) repeating the selecting and executing steps until no further legal moves remain for play and recording the resulting terminal board configuration;
  (iv) repeating steps (i), (ii) and (iii) of selecting, executing and repeating to obtain a plurality of terminal board configurations, n;
  (v) for each board position, calculating the proportion of n times that board position was associated with a given player in the n terminal board configurations; and selecting a player to be associated with that board position on the basis of a threshold applied to the calculated proportion; and
  (vi) presenting to one or more players of the game via a display controlled by the computer, information about the calculated proportions using marks on a graphical representation of a game board where the sizes of the marks represent the calculated proportions and the colors of the marks represent the selected players.

2. A method as claimed in claim 1 wherein the game is GO and wherein the step of selecting an empty board position further comprises selecting that board position such that it is not within an eye of the player whose move is current; wherein an eye is an empty board position whose four nearest neighbour board positions are occupied by the player whose move is current or are off-board positions.

3. A method as claimed in claim 1 wherein the step of selecting an empty board position is made in a substantially random manner.

4. A method as claimed in claim 1 wherein the step of selecting an empty board position is made on the basis of learnt information about patterns corresponding to game moves.

5. A method as claimed in claim 4 wherein the learnt information comprises belief distributions.

6. A method as claimed in claim 1 wherein the step of selecting an empty board position is made using a biased sampling technique.

7. A method as claimed in claim 1 which further comprises, if the proportion for a particular board position is within a specified range, prompting one or more of the players for information as to, with which player the particular board position is to be associated.

8. A method as claimed in claim 1 which further comprises, for a board position having a calculated proportion of 50%:
  identifying any pair of opposite color chains of playing pieces associated with that board position as a potential seki if any corresponding pairs of chains are found in the terminal board configurations whose life/death status is anti-correlated with one another.

9. A method as claimed in claim 1 which further comprises:
  at an automated system for playing the game, receiving information about the current board configuration; accessing the calculated proportions; and determining whether to offer to end the game on the basis of the calculated proportions.

10. An apparatus comprising:
  an input arranged to receive a board configuration to be scored in a game;
  a selector arranged to select an empty board position corresponding to a legal move of a player whose move is next;
  a game engine arranged to execute a move at the selected board position according to the rules of the game;
  a processor arranged to repeat the selecting and executing until no further legal moves remain for play and to record the resulting terminal board configuration;
  the processor being further arranged to continue repeating the selecting and executing to obtain a plurality of terminal board configurations, n;
  the processor being further arranged to, for each board position, calculate the proportion of n times that board position was associated with a given player in the n terminal board configurations; and to select a player to be associated with that board position on the basis of a threshold applied to the calculated proportion; and
  the processor being further arranged to present to one or more players of the game via a user interface, information about the calculated proportions using marks on a graphical representation of the board configuration wherein the sizes of the marks represent the calculated proportions and the colors of the marks represent the selected players.

11. An apparatus as claimed in claim 10 wherein the selector is arranged to select empty board positions in a substantially random manner.

12. An apparatus as claimed in claim 10 wherein the selector is arranged to select an empty board position using a biased sampling technique.

13. An apparatus as claimed in claim 10 which comprises an automated system for playing the game and wherein the processor is further arranged to determine whether to offer to end the game on the basis of the calculated proportions.

14. An apparatus as claimed in claim 10 wherein the processor is arranged to determine if the proportion for a particular board position is within a specified range, and in that case to prompt, via the user interface, one or more of the players for information as to which player the particular board position is to be associated with.

15. One or more device-readable media having device-executable instructions encoded thereon, the device-executable instructions upon execution by one or more processors configure a device to perform acts comprising:
  (i) selecting an empty board position corresponding to a legal move of a player whose move is next in a game;
  (ii) executing a move at the selected board position according to the rules of the game;
  (iii) repeating the selecting and the executing until no further legal moves remain for play and recording a resulting terminal board configuration;
  (iv) repeating (i) the selecting, (ii) the executing and (iii) the repeating to obtain a plurality of terminal board configurations, n;
  (v) for each board position, calculating a proportion of n times that board position was associated with a given player in the n terminal board configurations; and selecting a player to be associated with that board position on the basis of a threshold applied to the calculated proportion;

(vi) presenting to one or more players of the game, information about the calculated proportions; and (vii) using marks on a graphical representation of a game board to score the game where the sizes of the marks represent the calculated proportions and the colors of the marks the selected players.

16. One or more device-readable media as recited in claim 15, wherein the selecting an empty board position is made in a substantially random manner.

17. One or more device-readable media as recited in claim 15, wherein the game comprises one of GO or a territory game.

* * * * *